(12) United States Patent
Kim et al.

(10) Patent No.: US 11,716,682 B2
(45) Date of Patent: Aug. 1, 2023

(54) METHOD AND DEVICE FOR TRANSMITTING OR RECEIVING INFORMATION ABOUT LINKS IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/964,371

(22) Filed: Oct. 12, 2022

(65) Prior Publication Data

US 2023/0036941 A1 Feb. 2, 2023

Related U.S. Application Data

(63) Continuation of application No. 17/269,989, filed as application No. PCT/KR2019/010750 on Aug. 23, 2019, now Pat. No. 11,503,539.

(30) Foreign Application Priority Data

Aug. 23, 2018 (KR) .......................... 10-2018-0098876

(51) Int. Cl.
*H04W 52/02* (2009.01)
*H04B 1/00* (2006.01)
(Continued)

(52) U.S. Cl.
CPC ........ *H04W 52/0203* (2013.01); *H04B 1/005* (2013.01); *H04W 52/0216* (2013.01);
(Continued)

(58) Field of Classification Search
CPC ......... H04W 52/0203; H04W 52/0216; H04W 52/0229; H04W 74/0833; H04W 84/12; H04W 74/08; H04B 1/005; Y02D 30/70
See application file for complete search history.

(56) References Cited

U.S. PATENT DOCUMENTS 9,049,662 B2 6/2015 Fischer
11,503,539 B2 * 11/2022 Kim .................. H04W 52/0203
(Continued)

FOREIGN PATENT DOCUMENTS

WO 2016175435 11/2016
WO 2017119759 7/2017

OTHER PUBLICATIONS

U.S. Appl. No. 17/269,989, Office Action dated Mar. 29, 2022, 9 pages.
(Continued)

*Primary Examiner* — Eric Myers
(74) *Attorney, Agent, or Firm* — Lee Hong Degerman Kang Waimey

(57) ABSTRACT

The method executed in a wireless local area network (WLAN) system, according to various embodiments, may comprise: a step in which a reception station (STA), which supports a multilink comprising a first link and a second link, receives a target wake time (TWT) element via the first link, wherein the TWT element is received via a beacon and includes information for TWT period configuration for the second link; a step in which the reception STA configures a TWT period for the second link on the basis of the TWT element; and a step in which the reception STA communicates with a transmission STA via the second link within the TWT period.

16 Claims, 34 Drawing Sheets

(51) Int. Cl.
*H04W 74/08* (2009.01)
*H04W 84/12* (2009.01)

(52) U.S. Cl.
CPC .... *H04W 52/0229* (2013.01); *H04W 74/0833* (2013.01); *H04W 84/12* (2013.01)

(56) References Cited

U.S. PATENT DOCUMENTS

| | | |
|---|---|---|
| 2015/0189592 A1 | 6/2015 | Jafarian et al. |
| 2018/0206190 A1 | 7/2018 | Cherian et al. |
| 2019/0335454 A1* | 10/2019 | Huang ................. H04W 48/08 |
| 2021/0329547 A1 | 10/2021 | Kim et al. |

OTHER PUBLICATIONS

Abhishek Patil, et al., "Resolution for CID in 27.7.3.1 (TWT)", doc.: IEEE 802.11-18/0739r1, May 2018, 4 pages.
PCT International Application No. PCT/KR2019/010750, International Searching Authority dated Dec. 4, 2019, 4 pages.

* cited by examiner

FIG. 3

| Channel | F₀ (MHz) | North America | Japan | Most of world |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | Yes | Yes | Yes |
| 14 | 2484 | Yes | 11b Only | No |

METHOD AND DEVICE FOR TRANSMITTING OR RECEIVING INFORMATION ABOUT LINKS IN WIRELESS LAN SYSTEM

CROSS-REFERENCE TO RELATED APPLICATIONS

This application is a continuation of U.S. patent application Ser. No. 17/269,989, filed on Feb. 19, 2021, which is the National Stage filing under 35 U.S.C. 371 of International Application No. PCT/KR2019/010750, filed on Aug. 23, 2019, which claims the benefit of earlier filing date and right of priority to Korean Application No. 10-2018-0098876, filed on Aug. 23, 2018, the contents of which are all incorporated by reference herein their entirety.

BACKGROUND OF THE DISCLOSURE

Field of the Disclosure

The present disclosure relates to a scheme of transmitting/receiving data in wireless communication, and more particularly, to a method and apparatus for transmitting/receiving information on a link for performing communication in a wireless local area network (WLAN) system.

Related Art

A method for reducing power consumption in a wireless local area network (WLAN) has been improved in various manners. For example, in the IEEE 802.11ah standard, a target wake time (TWT) technology has been proposed. In addition, in the IEEE 802.11ax standard, the TWT technology has been extended to individual TWT or broadcast TWT technologies.

According to the broadcast TWT technology, a transmitting station (STA) (or an access point (AP)) may configure a service period (SP) in order to transmit/receive buffered data to/from a receiving STA operating at low power. The transmitting STA and the receiving STA may perform communication within the SP. The transmitting STA may transmit information for configuring the SP to the receiving STA through a beacon.

SUMMARY

In general, a station (STA) based on the existing IEEE 802.11 standard uses one channel to transmit/receive one packet or frame. The existing STA does not have to transmit a signal through a plurality of channels. A multi-link can be supported starting from the IEEE 802.11be standard. Therefore, when performing a target wake time (TWT) operation, the existing STA cannot receive information for configuring a service period (SP) in a second link through a first link.

In addition, the receiving STA operating in a 6 GHz band does not have a legacy system, and thus may operate by prohibiting enhanced distributed channel access (EDCA) to improve performance. Therefore, when operating by prohibiting the EDCA, an operation of the receiving STA or transmitting STA shall be compensated for.

An example according to the present specification proposes a method and apparatus for transmitting or receiving information on a link for performing communication in a wireless local area network (WLAN) system. Specifically, there may be a need for a method in which information for communication to a second link is received through a first link and communication is performed through the second link.

A method performed in a WLAN system according to various embodiments may include receiving, by a receiving STA supporting a multi-link including a first link and a second link, a TWT element through the first link, wherein the TWT element is received through a beacon, and the TWT element includes information for configuring a TWT period for the second link, configuring, by the receiving STA, the TWT period for the second link, based on the TWT element, and performing, by the receiving STA, communication with a transmitting STA through the second link within the TWT period.

Effects of the Disclosure

Based on an example according to the present specification, a transmission station (STA) (or an access point (AP)) may transmit a beacon to a receiving STA through a first link. The beacon may include a target wake time (TWT) element. The TWT element may include information for configuring a service period (SP) through a second link. Therefore, the transmitting STA and the receiving STA may perform communication within the SP through the second link. Specifically, the receiving STA may transmit a trigger frame, and may perform communication, based on an OFDMA random access resource included in the trigger frame. Therefore, when a receiving STA operating at low power receives information of a transmission timing or the like of the trigger frame through the beacon, unnecessary power consumption may be reduced.

In addition, based on an example of the present specification, a method of configuring an SP through a first link and performing communication through a second link may enable effective signal transmission.

BRIEF DESCRIPTION OF THE DRAWINGS

FIG. 3 illustrates a frequency domain used in a WLAN system.

DESCRIPTION OF EXEMPLARY EMBODIMENTS

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or a new WLAN stand which has enhanced IEEE 802.11be.

Hereinafter, in order to describe a technical feature of the present specification, a technical feature of a WLAN system to which the present specification is applicable will be described.

Figure 1:
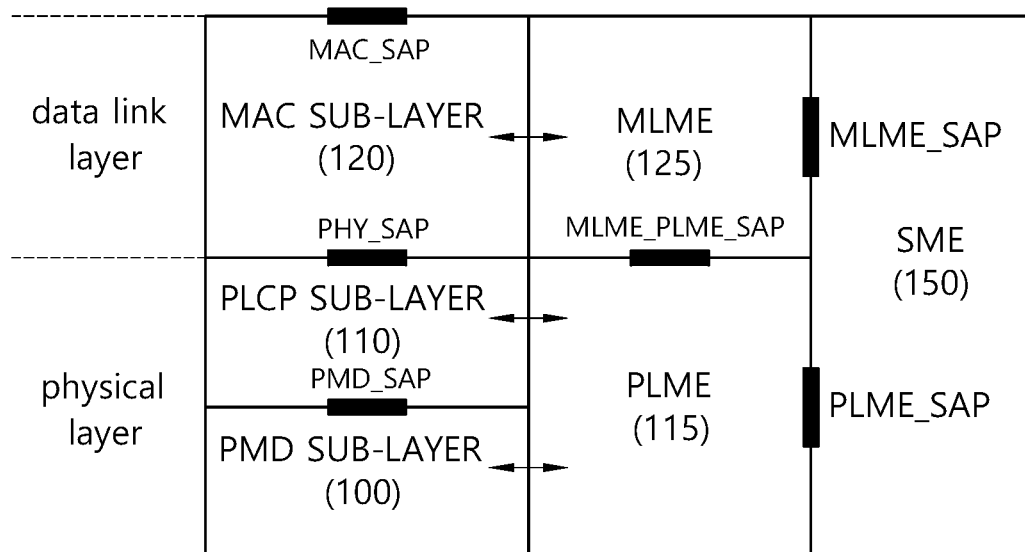
FIG. 1 is a conceptual view illustrating a layered architecture of a WLAN system supported by IEEE 802.11.

FIG. 1 is a conceptual view illustrating a layered architecture of a WLAN system supported by IEEE 802.11. Referring to FIG. 1, the layered architecture of the WLAN system may include a physical medium dependent (PMD) sublayer 100, a physical layer convergence procedure (PLCP) sublayer 110, and a medium access control (MAC) sublayer 120.

The PLCP sublayer 100 may serve as a transmission interface for transmitting/receiving data between a plurality of STAs. The PLCP sublayer 110 is implemented such that the MAC sublayer 120 is operated with a minimum dependency with respect to the PMD sublayer 100.

The PMD sublayer 100, the PLCP sublayer 110, and the MAC sublayer 120 may conceptually include respective management entities. For example, the management entity of the MAC sublayer 120 is referred to as a MAC layer management entity (MLME) 125. The management entity of the physical layer is referred to as a PHY layer management entity (PLME) 115.

The management entities may provide an interface for performing a layer management operation. For example, the PLME 115 may be connected to the MLME 125 to perform a management operation of the PLCP sublayer 110 and the PMD sublayer 100. The MLME 125 may be connected to the PLME 115 to perform a management operation of the MAC sublayer 120.

An STA management entity (SME) 150 may exist to perform a proper MAC layer operation. The SME 150 may be operated as a constitutional element independent of each layer. The PLME 115, the MLME 125, and the SME 150 may mutually transmit and receive information on the basis of a primitive.

The operation of each sublayer is briefly described as follows. For example, the PLCP sublayer 110 delivers a MAC protocol data unit (MPDU) received from the MAC sublayer 120 according to an instruction of the MAC layer between the MAC sublayer 120 and the PMD sublayer 100 to the PMD sublayer 100 or delivers a frame from the PMD sublayer 100 to the MAC sublayer 120.

The PMD sublayer 100 is a PLCP sublayer, and may transmit and receive data between a plurality of STAs through a wireless medium. The MPDU delivered from the MAC sublayer 120 is referred to as a physical service data unit (PSDU) in the PLCP sublayer 110. Although the MPDU is similar to the PSDU, if an aggregated MPDU (AMPDU) obtained by aggregating a plurality of MPDUs is delivered, the MPDUs may be individually different from the PSDUs.

The PLCP sublayer 110 adds an additional field including information required by a transceiver of a physical layer in a process of receiving the PSDU from the MAC sublayer 120 and delivering it to the PMD sublayer 100. In this case, the field added to the PSDU may be a PLCP preamble, a PLCP header, and tail bits required to return a convolution encoder to a zero state.

The PLCP sublayer 110 adds the aforementioned fields to the PSDU to generate a PLCP protocol data unit (PPDU) and transmits the PPDU to a receiving station through the PMD sublayer 100. The receiving station receives the PPDU to perform restoration by obtaining information required to restore data from the PLCP preamble and the PLCP header.

The STA as any functional medium including a medium access control (MAC) that follows a regulation of the institute of electrical and electronics engineers (IEEE) 802.11 standard and a physical layer interface for a radio medium may be used as a meaning including both AP and non-AP STAs.

The STA may be called in various names such as a mobile terminal, a wireless device, a wireless transmit/receive unit (WTRU), a user equipment (UE), a mobile station (MS), a mobile subscriber unit, or simply a user.

Figure 2:
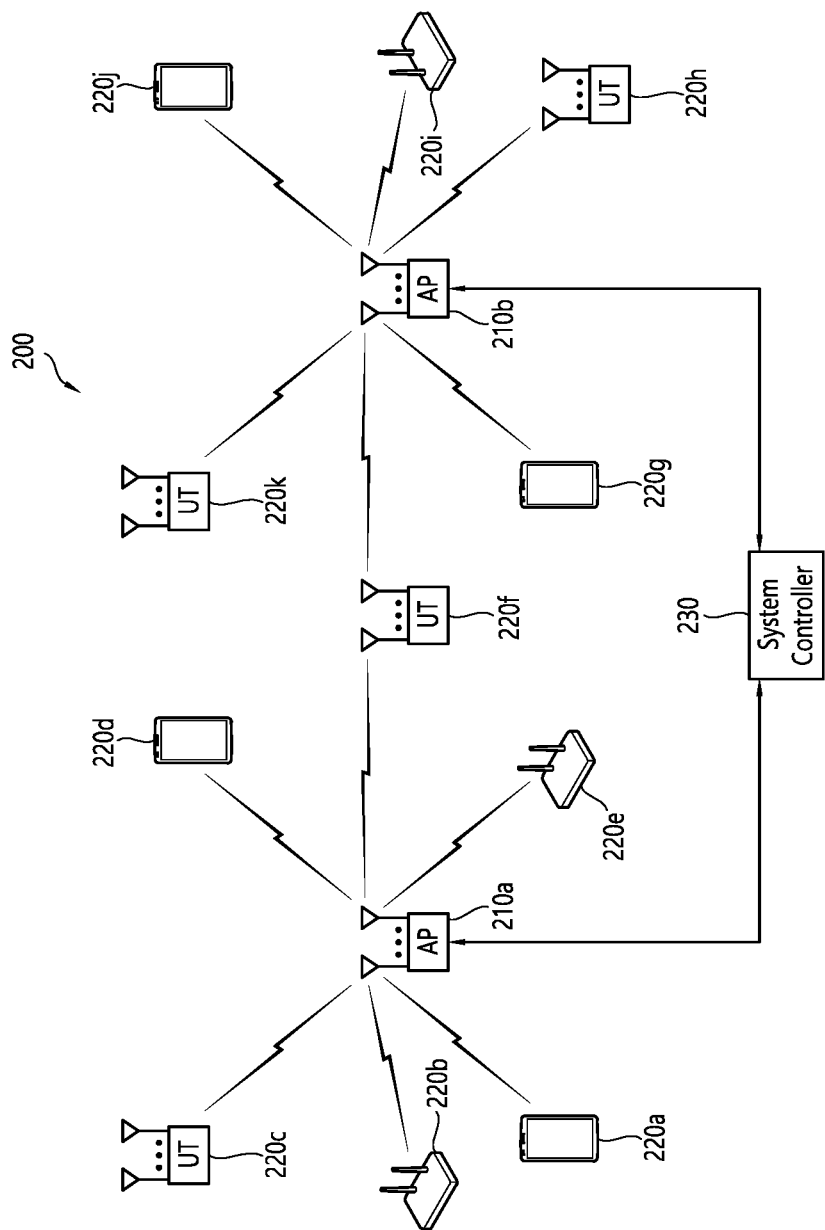
FIG. 2 illustrates an example of a WLAN system.

FIG. 2 illustrates an example of a WLAN system.

As illustrated, the WLAN system includes at least one access point (AP) and a plurality of STAs 520a/b/c/e/d/f/g/h/i/j/k associated with the AP. The plurality of STAs in the example of FIG. 2 may perform an AP and/or non-AP function. The plurality of STAs 520a/b/c/e/d/f/g/h/i/j/k of FIG. 2 may be called in various terms such as a user terminal (UT), or the like. In addition, the at least one STA 520f of FIG. 2 may route/relay communication between the plurality of APs 510a/b, or control the plurality of APs, or control the plurality of STA associated with the plurality of APs 510a/b.

In addition, the AP 510a/b of FIG. 2 may be associated with a system control device 530 to communicate with a different AP, or may communicate with another network entity (e.g., a network entity or Internet server defined by the 3GPP standard) other than the different AP.

The plurality of STAs of FIG. 2 may configure a basic service set (BSS).

BSSs 100 and 105, as a set of an AP and an STA which are successfully synchronized to communicate with each other, are not the concept indicating a specific region. The BSS may include one or more STAs that can be coupled to one AP.

The BSS may include at least one STA, an AP providing a distribution service, and a distribution system connecting a plurality of APs.

The distribution system may configure an extended service set (ESS) as a service set extended by connecting several BSSs. The ESS may be used as a term indicating one network configured by connecting one or more APs through the distribution system. The AP included in one ESS may have the same service set identification (SSID).

A portal may serve as a bridge which connects the WLAN network (IEEE 802.11) and another network (e.g., 802.X).

The network may be configured even between the STAs without the AP to perform communication. Such a network may be called an Ad-Hoc network or an independent basic service set (IBSS).

FIG. 3 illustrates a frequency domain used in a WLAN system.

The WLAN system may use at least one channel defined within a 2.4 GHz band. The 2.4 GHz band may be called in other terms such as a first band or the like.

As shown in FIG. 3, 14 channels may be configured in a 2.4 GHz band. Each channel may be set to a frequency domain (or bandwidth) of 20 MHz. F0 may indicate a center frequency. A center frequency of a channel within the 2.4 GHz band may be configured with an interval of about 5 MHz, except for a channel 14. Among the 14 channels, adjacent channels may overlap with each other. For each county, an allowed frequency channel or a maximum power level within the allowed frequency channel may be set to be different. For example, a channel 13 may be a channel which is not allowed in North America but is allowed in most countries.

A specific numerical value shown in the example of FIG. 3 may be changed.

Figure 4:
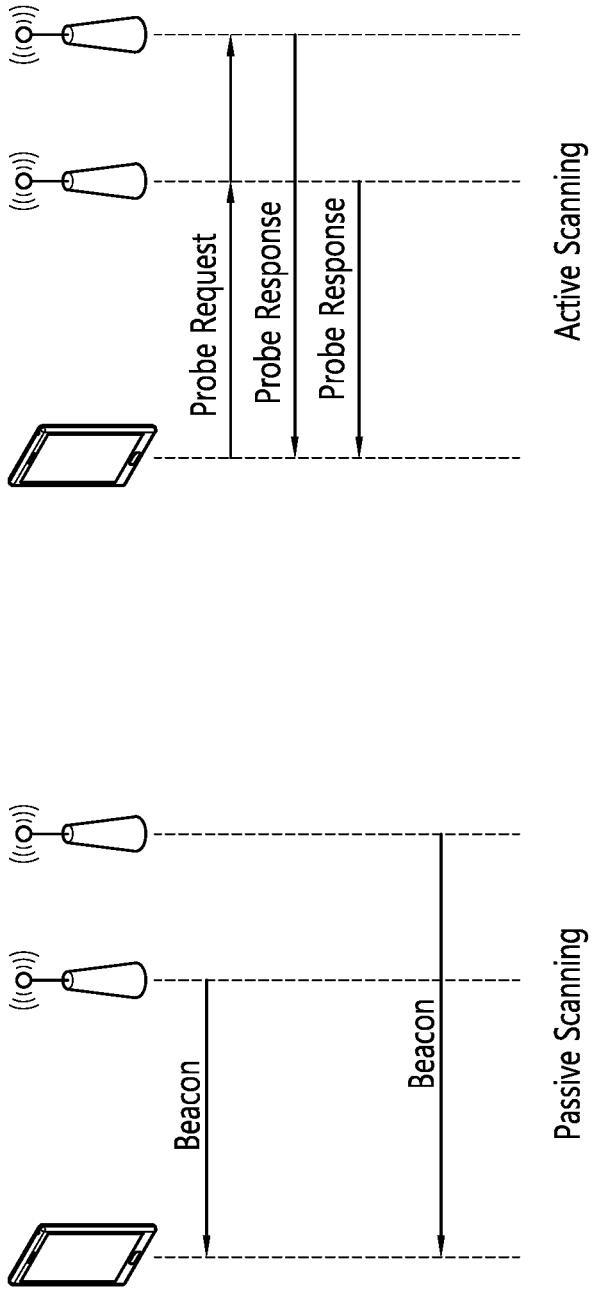
FIG. 4 illustrates an example regarding a network discovery/detection.

FIG. 4 illustrates an example regarding a network discovery/detection.

An STA shall discover a network to access a WLAN network. Such a discovery may be performed through a scanning process for the network. The scanning may be classified into active scanning and passive scanning.

As shown in FIG. 4, an STA performing active scanning may transmit a probe request frame and wait for a response thereof in order to search for a nearby AP while moving from one channel to another. A responder may transmit a probe response frame to the STA which has transmitted the probe request frame, in response to the probe request frame. The responder may be an STA which has last transmitted a beacon frame in a BSS of a channel being scanned. In the BSS, since an AP transmits the beacon frame, the AP is the responder. In an IBSS, since STAs in the IBSS transmit the beacon frame in turn, the responder may be changed.

When the STA transmits the probe request frame through a channel 1 and receives the probe response frame through the channel 1, the STA may store BSS-related information included in the received probe response frame, and may move to a next channel (e.g., a channel 2) to repeat scanning in the same manner.

As shown in FIG. 4, the scanning operation may also be performed in a passive scanning manner. An STA performing scanning based on the passive scanning may receive a beacon frame while moving from one channel to another.

The beacon frame is an example of a management frame in IEEE 802.11. The beacon frame may be periodically transmitted. An STA which has received the beacon frame may store BSS-related information included in the received beacon frame and move to a next channel, and may perform passive scanning in the next channel.

Although not shown in FIG. 4, a plurality of procedures may be performed after the scanning procedure of FIG. 4.

For example, an authentication process may be performed after the scanning procedure. The authentication process may include a process in which an STA transmits an authentication request frame to an AP, and the AP transmits an authentication response frame to the STA in response thereto. An authentication frame used in the authentication request/response corresponds to the management frame.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 5:
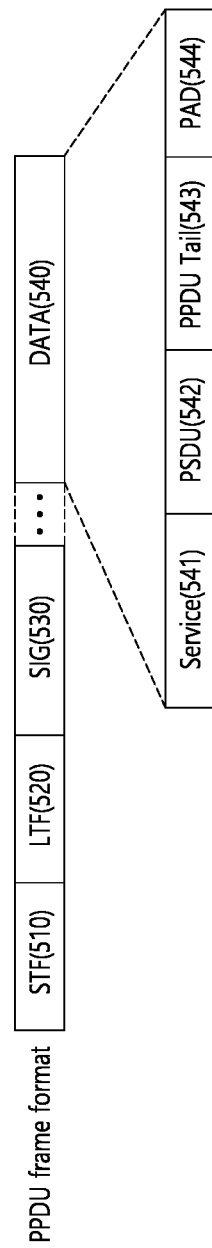
FIG. 5 illustrates an example of a PPDU transmitted/received by an STA of the present specification.

FIG. 5 illustrates an example of a PPDU transmitted/received by an STA of the present specification.

The example of FIG. 5 illustrates a representative field of the PPDU, and an order of fields shown in FIG. 5 may be variously changed.

The PPDU of FIG. 5 may include a short training field (STF) 510.

The STF 510 may be embodied as L-STF, HT-STF, VHT-STF, HE-STF, EHT-STF, or the like described below. The STF 510 may be used for frame detection, automatic gain control (AGC), diversity detection, and coarse frequency/time synchronization.

The PPDU of FIG. 5 may include a long training field (LTF) 520.

The LTF 520 may be embodied as L-LTF, HT-LTF, VHT-LTF, HE-LTF, EHT-LTF, or the like described below. The LTF 520 may be used for fine frequency/time synchronization and channel prediction.

The PPDU of FIG. 5 may include an SIG 530.

The SIG 530 may be embodied as L-SIG, HT-SIG, VHT-SIG, HE-SIG, EHT-SIG, or the like described below. The SIG 530 may include control information for decoding the PPDU.

The PPDU of FIG. 5 may include a data field 540.

The data field 540 may include a service field 541, a physical layer service data unit (PSDU) 542, a PPDU tail bit 543, and a padding bit 544. Some bits of the service field 541 may be used for synchronization of a descrambler at a receiving end. The PSDU 542 may correspond to a MAC protocol data unit (MPDU) defined in a MAC layer, and may include data generated/used in an upper layer. The PPDU tail bit 543 may be used to return an encoder to a zero state. The padding bit 544 may be used to adjust a length of the data field on a specific unit basis.

Figure 6:
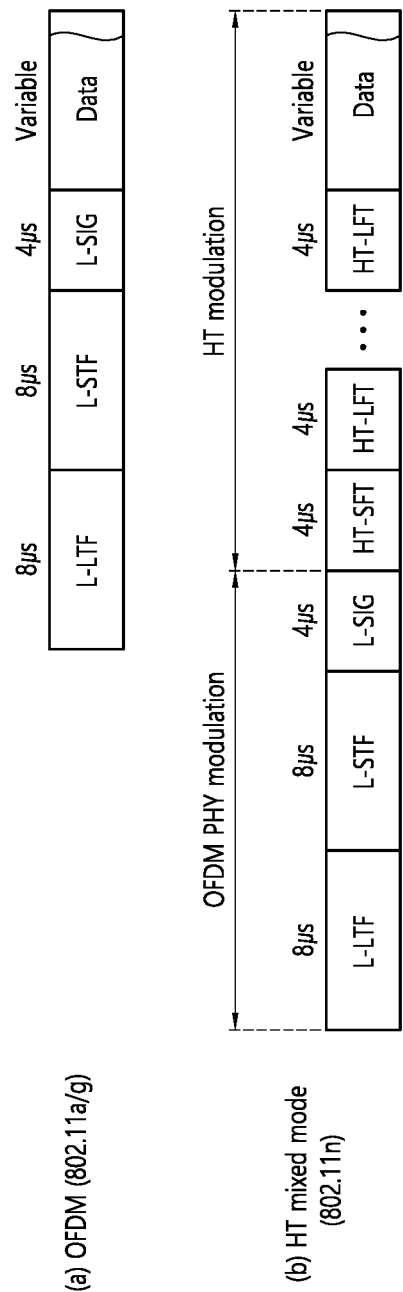
FIG. 6 illustrates an example of a PPDU according to the existing WLAN standard.

FIG. 6 illustrates an example of a PPDU according to the existing WLAN standard.

The PPDU shown in a sub-figure (a) of FIG. 6 is an example of the PPDU used in the IEEE 802.11a/g standard.

The PPDU shown in a sub-figure (b) of FIG. 6 is an example of the PPDU used in the IEEE 802.11n standard.

Figure 7:
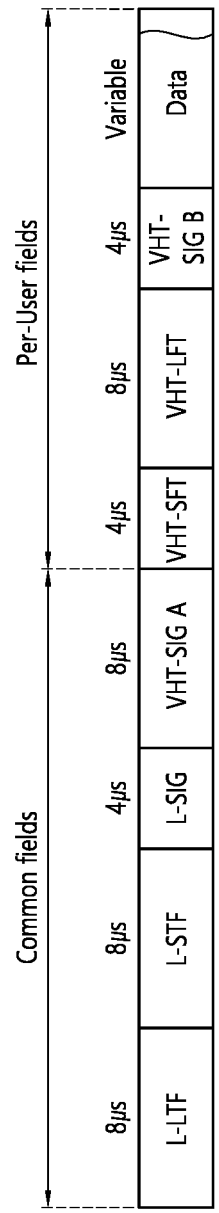
FIG. 7 illustrates another example of a PPDU according to the existing WLAN standard.

FIG. 7 illustrates another example of a PPDU according to the existing WLAN standard.

The example of FIG. 7 illustrates an example of the PPDU according to the IEEE 802.11ac standard. The illustrated common fields include the existing L-STF, L-LTF, and L-SIG, and also include a VHT-SIG-A field newly proposed in the IEEE 802.11ac standard. The PPDU of FIG. 7 may be used both in single user (SU) communication in which a signal is transmitted from an AP to one user STA and multi-user (MU) communication in which a signal is transmitted from the AP to a plurality of user STAs. When the MU communication is performed, the VHT-SIG-A field includes common control information commonly applied to all receiving STAs.

When the MU communication is performed, per-user fields shown in FIG. 7 include a field transmitted for at least any one user STA. The VHT-STF field is an STF field newly proposed in the VHT standard (i.e., IEEE 802.11ac), and the VHT-LTF field is an LTF field newly proposed in the VHT standard. The VHT-SIG-B field may include information for decoding a data field, and may be configured individually for each receiving STA.

The PPDU of FIG. 7 may be transmitted to a plurality of STAs, based on a multi-user multiple input multiple output (MU-MIMO) scheme. In addition, the PPDU may be transmitted to one STA, based on an SU-MIMO scheme.

Figure 8:
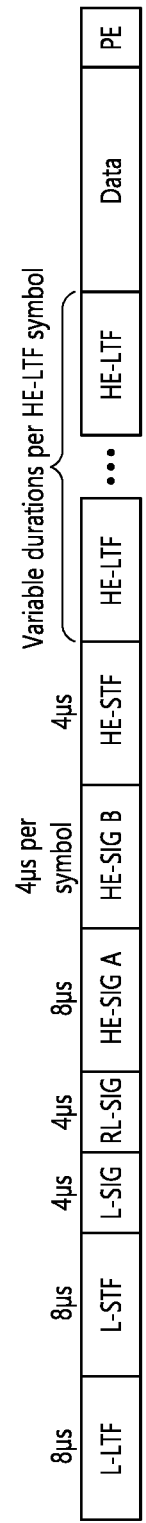
FIG. 8 illustrates another example of an HE-PPDU.

FIG. 8 illustrates another example of an HE-PPDU.

The example of FIG. 8 may be applied to an IEEE 802.11ax or high efficiency (HE) WLAN system. Four types of PPDU formats are defined based on IEEE 802.11ax, and the example of FIG. 8 is an example of an MU-PPDU used in MU communication. However, some of technical features applied to the field shown in FIG. 8 may also be directly used in SU communication or UL-MU communication.

The technical feature of the HE-PPDU shown in FIG. 8 may also be applied to an EHT-PPDU to be newly proposed. For example, the technical feature applied to the HE-SIG may also be applied to the EHT-SIG, and the technical feature applied to the HE-STF/LTF may also be applied to the EHT-STF/LTF.

An L-STF of FIG. 8 may include a short training orthogonal frequency division multiplexing (OFDM) symbol. The L-STF may be used for frame detection, automatic gain control (AGC), diversity detection, and coarse frequency/time synchronization.

An L-LTF of FIG. 8 may include a long training orthogonal frequency division multiplexing (OFDM) symbol. The L-LTF may be used for fine frequency/time synchronization and channel prediction.

An L-SIG of FIG. 8 may be used for transmitting control information. The L-SIG may include information regarding a data rate and a data length. Further, the L-SIG may be repeatedly transmitted. That is, a new format in which the L-SIG is repeated (for example, may be referred to as R-LSIG) may be configured.

An HE-SIG-A of FIG. 8 may include the control information common to a receiving STA.

Specifically, the HE-SIG-A may include information on: 1) a DL/UL indicator; 2) a BSS color field as an identifier of a BSS; 3) a field indicating a remaining time of a current TXOP period; 4) a bandwidth field indicating whether it is 20, 40, 80, 160 and 80+80 MHz; 5) a field indicating an MCS scheme applied to the HE-SIG-B; 6) an indication field regarding whether the HE-SIG-B is modulated by a dual subcarrier modulation scheme for MCS; 7) a field indicating the number of symbols used for the HE-SIG-B; 8) a field indicating whether the HE-SIG-B is generated across a full band; 9) a field indicating the number of symbols of the HE-LTF; 10) a field indicating the length of the HE-LTF and a CP length; 11) a field indicating whether an additional OFDM symbol is present for LDPC coding; 12) a field indicating control information regarding packet extension (PE); and 13) a field indicating information on a CRC field of the HE-SIG-A. A specific field of the HE-SIG-A may be added or partially omitted. Further, some fields of the HE-SIG-A may be partially added or omitted in other environments other than a multi-user (MU) environment.

An HE-SIG-B of FIG. 8 may be included only in the case of the PPDU for the multiple users (MUs) as described above. Basically, an HE-SIG-A or an HE-SIG-B may include resource allocation information (or virtual resource allocation information) for at least one receiving STA.

An HE-STF of FIG. 8 may be used for improving automatic gain control estimation in a multiple input multiple output (MIMO) environment or an OFDMA environment.

An HE-LTF of FIG. 8 may be used for estimating a channel in the MIMO environment or the OFDMA environment.

The size of fast Fourier transform (FFT)/inverse fast Fourier transform (IFFT) applied to the HE-STF and the field after the HE-STF, and the size of the FFT/IFFT applied to the field before the HE-STF may be different from each other. For example, the size of the FFT/IFFT applied to the HE-STF and the field after the HE-STF may be four times greater than the size of the FFT/IFFT applied to the field before the HE-STF.

For example, when at least one field of the L-STF, the L-LTF, the L-SIG, the HE-SIG-A, and the HE-SIG-B on the PPDU of FIG. 8 is referred to as a first field/part, at least one of the data field, the HE-STF, and the HE-LTF may be referred to as a second field/part. The first field may include a field associated with a legacy system, and the second field may include a field associated with an HE system. In this case, the fast Fourier transform (FFT) size and the inverse fast Fourier transform (IFFT) size may be defined as a size which is N (N is a natural number, e.g., N=1, 2, and 4) times greater than the FFT/IFFT size used in the legacy WLAN system. That is, the FFT/IFFT size applied to the second field of the HE PPDU may be N(=4) times greater than that applied to the first field of the HE PPDU. For example, 256FFT/IFFT may be applied to a bandwidth of 20 MHz, 512FFT/IFFT may be applied to a bandwidth of 40 MHz, 1024FFT/IFFT may be applied to a bandwidth of 80 MHz, and 2048FFT/IFFT may be applied to a bandwidth of continuous 160 MHz or discontinuous 160 MHz.

In other words, a subcarrier space/spacing may have a size which is 1/N times (N is the natural number, e.g., N=4, the subcarrier spacing is set to 78.125 kHz) the subcarrier space used in the legacy WLAN system. That is, a subcarrier spacing having a size of 312.5 kHz, which is a legacy subcarrier spacing, may be applied to the first field/part of the HE PPDU and a subcarrier space having a size of 78.125 kHz may be applied to the second field/part of the HE PPDU.

Alternatively, it may be expressed that an IDFT/DFT period applied to each symbol of the first field is N(=4) times shorter than the IDFT/DFT period applied to each data symbol of the second field. That is, it may be expressed that the IDFT/DFT length applied to each symbol of the first field of the HE PPDU is 3.2 µs and the IDFT/DFT length applied to each symbol of the second field of the HE PPDU is 3.2 µs*4 (=12.8 µs). The length of the OFDM symbol may be a value obtained by adding the length of a guard interval (GI) to the IDFT/DFT length. The length of the GI may have various values such as 0.4 µs, 0.8 µs, 1.6 µs, 2.4 µs, and 3.2 µs.

The technical feature in which subcarrier spacings having different sizes are applied to one PPDU may also be applied directly to the EHT-PPDU. That is, a subcarrier spacing of 312.5 kHz may be applied to a first portion/part of the EHT-PPDU, and a subcarrier spacing of 78.125 kHz may be applied to a second field/part of the EHT-PPDU. The first portion/part of the EHT-PPDU may include L-LTF, L-STF, L-SIG, EHT-SIG-A, and/or EHT-SIG-B. In addition, a second portion/part of the EHT-PPDU may include EHT-STF, EHT-LTF, and/or a data field. The division of the first portion/second portion of the EHT-PPDU may be changed Hereinafter, a resource unit (RU) used in the PPDU is described. The RU may include a plurality of subcarriers (or tones). The RU may be used when a signal is transmitted to a plurality of STAs, based on an OFDMA scheme. In addition, the RU may also be defined when a signal is transmitted to one STA. The RU may be used for the STF, the LTF, the data field, or the like.

Figure 9:
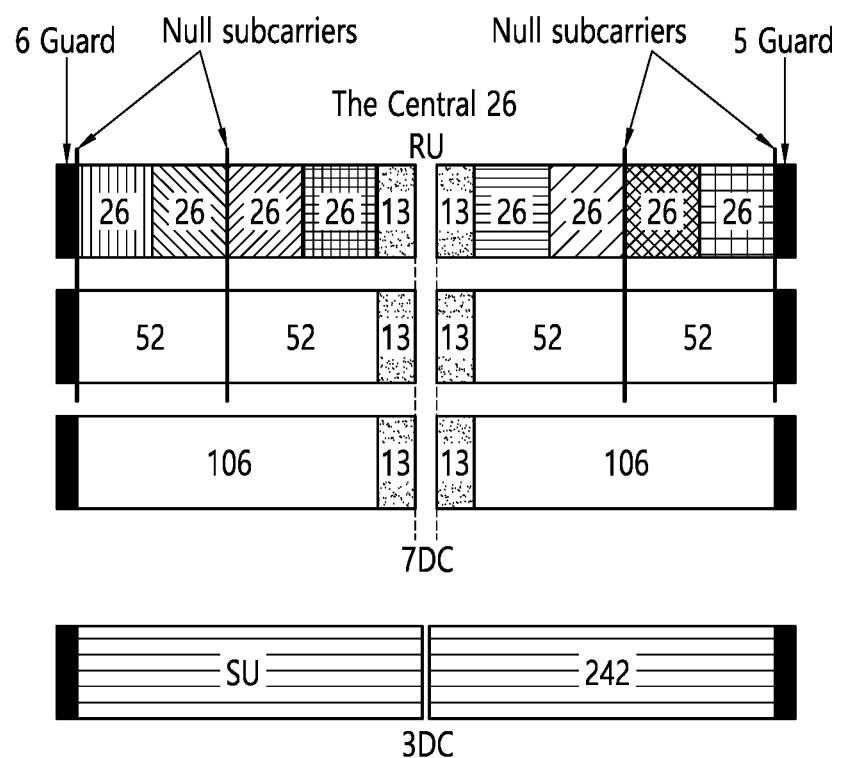
FIG. 9 illustrates a layout of resource units (RUs) used on a 20 MHz band.

FIG. 9 illustrates a layout of resource units (RUs) used on a 20 MHz band.

As illustrated in FIG. 9, RUs corresponding to tones (i.e., subcarriers) different in number may be used to configure some fields of the HE-PPDU. For example, the resources may be allocated by the unit of RUs illustrated for the HE-STF, the HE-LTF, and the data field.

As illustrated in an uppermost part of FIG. 9, a 26-unit (i.e., a unit corresponding to 26 tones) may be disposed. 6 tones may be used as a guard band in a leftmost band of the 20 MHz band, and 5 tones may be used as a guard band in a rightmost band of the 20 MHz band. Further, 7 DC tones may be inserted into a center band, that is, a DC band, and a 26-unit corresponding each 13 tones may be present at left and right sides of the DC band. Further, the 26-unit, a 52-unit, and a 106-unit may be allocated to other bands. Each unit may be allocated for a receiving STA, that is, a user.

Meanwhile, the RU layout of FIG. 9 may be used not only in a multi-user (MU) situation but also in a single user (SU) situation. In this case, as illustrated in a lowermost part of FIG. 9, it is possible to use one 242-unit, and 3 DC tones may be inserted.

In an example of FIG. 9, RUs having various sizes, that is, a 26-RU, a 52-RU, a 106-RU, a 242-RU, and the like are proposed. As a result, since specific sizes of the RUs may be extended or increased, the present embodiment is not limited to a specific size (i.e., the number of corresponding tones) of each RU.

Figure 10:
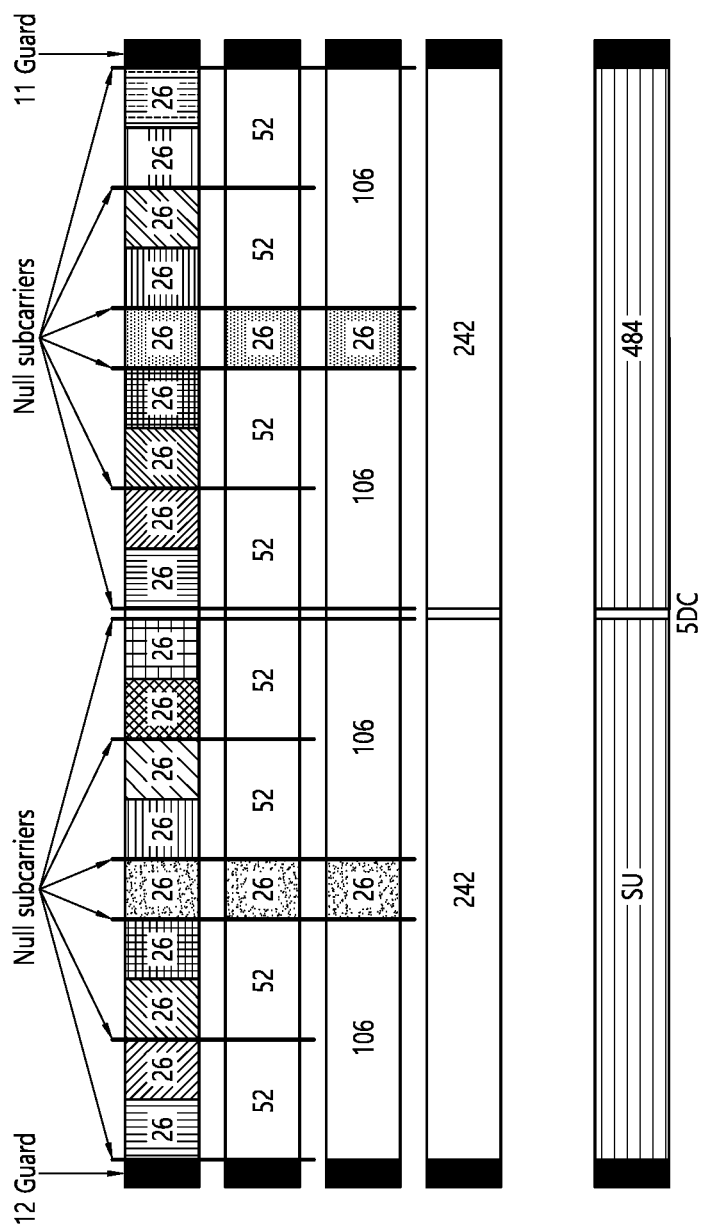
FIG. 10 illustrates a layout of RUs used on a 40 MHz band.

FIG. 10 illustrates a layout of RUs used on a 40 MHz band.

Similarly to a case in which the RUs having various sizes are used in the example of FIG. 9, a 26-RU, a 52-RU, a 106-RU, a 242-RU, a 484-RU, and the like may also be used in an example of FIG. 10. Further, 5 DC tones may be inserted into a center frequency, 12 tones may be used as a guard band in a leftmost band of a 40 MHz band, and 11 tones may be used as a guard band in a rightmost band of the 40 MHz band.

In addition, as illustrated, when used for a single user, the 484-RU may be used. Meanwhile, the specific number of RUs may be changed similarly to the example of FIG. 9.

Figure 11:
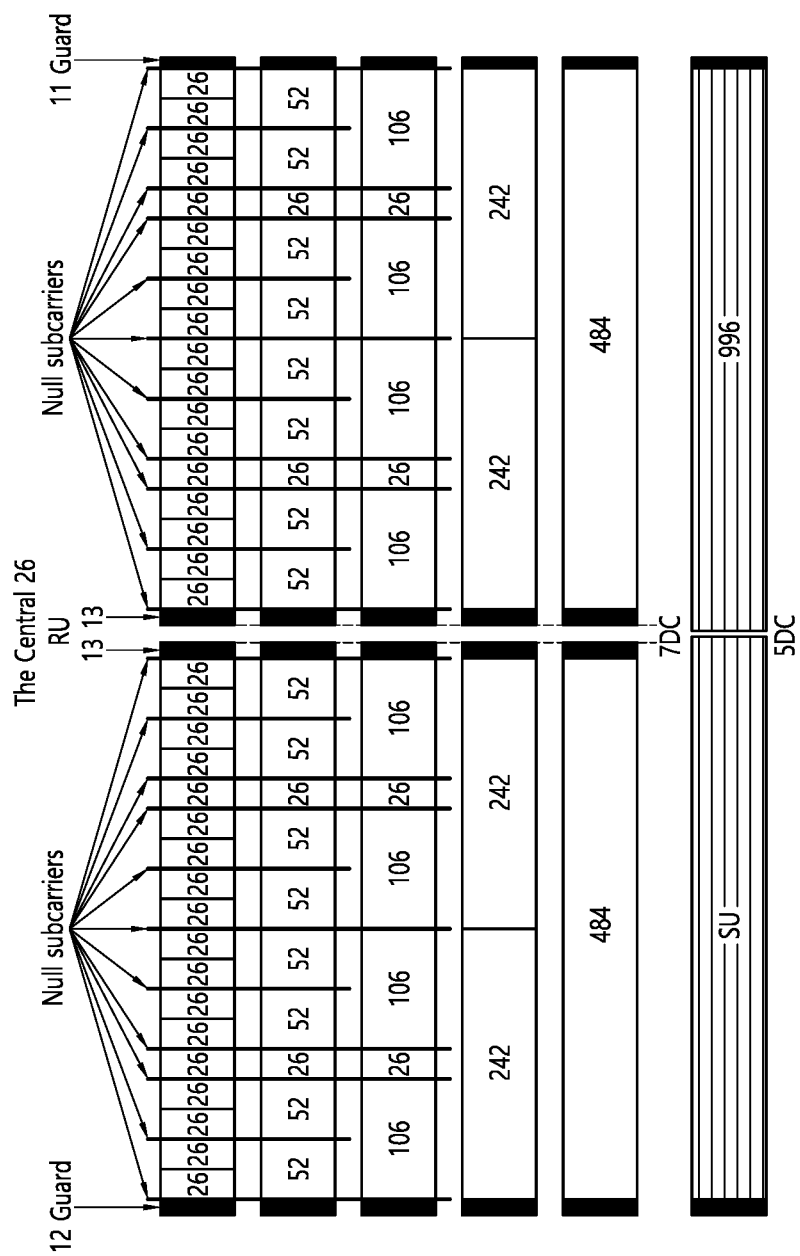
FIG. 11 illustrates a layout of RUs used on an 80 MHz band.

FIG. 11 illustrates a layout of RUs used on an 80 MHz band.

Similarly to a case in which the RUs having various sizes are used in the examples of FIG. 9 and FIG. 10, a 26-RU, a 52-RU, a 106-RU, a 242-RU, a 484-RU, and the like may also be used in an example of FIG. 11. Further, 7 DC tones may be inserted into a center frequency, 12 tones may be used as a guard band in a leftmost band of an 80 MHz band, and 11 tones may be used as a guard band in a rightmost band of the 80 MHz band. Furthermore, the 26-RU, which uses each 13 tones located at left and right sides of the DC band, may be used.

In addition, as illustrated, when used for a single user, the 996-RU may be used. In this case, 5 DC tones may be inserted.

Meanwhile, the specific number of RUs may be changed similarly to the example of FIG. 9 and FIG. 10.

The RU shown in FIG. 9 to FIG. 11 may be used in OFDMA-based communication. That is, any one RU(26/52/106/242-RU, etc.) shown in FIG. 9 to FIG. 11 may be allocated to any one STA, and another RU may be allocated to another STA. That is, MU communication is possible in such a manner that the RU shown in FIG. 9 to FIG. 11 is allocated to a plurality of STAs. The MU communication may be applied to downlink communication and may also be applied to uplink communication.

The MU PPDU shown in FIG. 8 may be used for DL MU communication. That is, the DL-MU communication is possible through an OFDMA and/or MU-MIMO scheme, based on the PPDU of FIG. 8.

In addition, UL MU communication is also supported in the WLAN system. A trigger frame is defined for UL MU communication. The trigger frame may include ID information for a plurality of STAs participating in UL MU communication and a radio resource (e.g., RU information) used in the UL MU communication.

Figure 12:
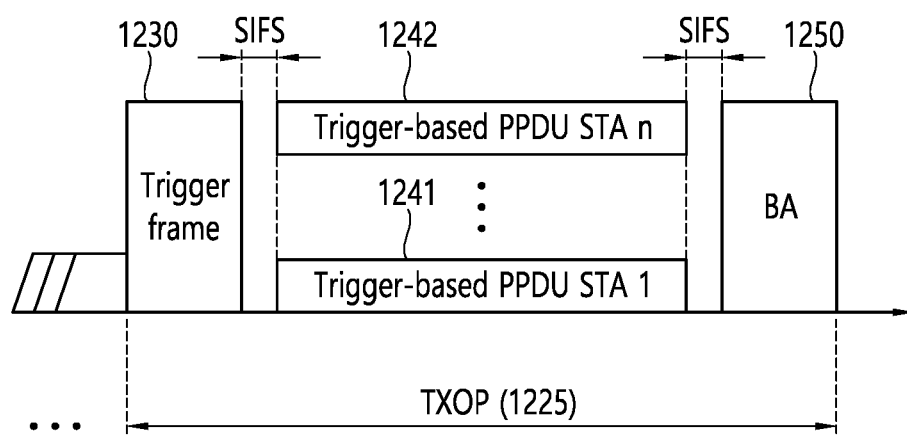
FIG. 12 illustrates an example of UL MU communication.

FIG. 12 illustrates an example of UL MU communication.

According to the example of FIG. 12, an AP transmits a trigger frame 1330. The trigger frame may be defined in the form of a MAC frame, and may be transmitted from the AP by being included in a PPDU of various formats. That is, when the PPDU including the trigger frame 1330 is received in an STA, UL MU communication starts after a short interframe space (SIFS) period. Specifically, a plurality of STAs (i.e., an STA 1 to an STA n) indicated by the trigger frame 1330 perform the UL-MU communication, based on an uplink resource (i.e., RU) indicated by the trigger frame 1330. Specifically, the plurality of STAs (i.e., the STA 1 to the STA n) transmit to the AP a trigger based (TB) PPDU according to the IEEE 802.11ax standard. A plurality of TB PPDUs transmitted by the plurality of STAs may be transmitted in the same time period, and information on the same time period may be included in the trigger frame 1330. Thereafter, the AP may transmit an ACK/NACK signal for TB PPDUs 1341 and 1342 through a block ACK (BA). The UL MU communication may be performed within a period of a TXOP 1325 obtained by the AP.

Figure 13:
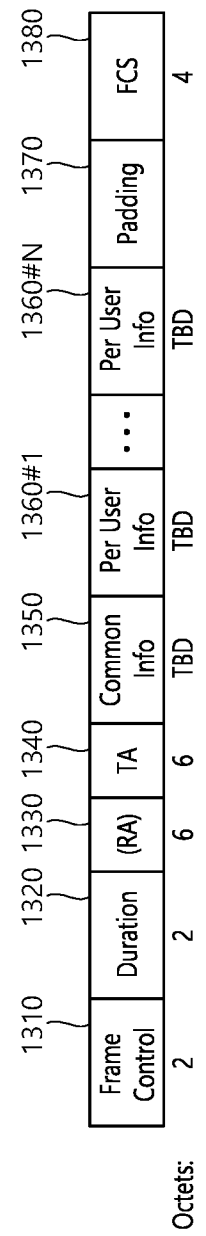
FIG. 13 illustrates an example of a trigger frame.

FIG. 13 illustrates an example of a trigger frame. The trigger frame of FIG. 13 may allocate a resource for uplink multiple-user (MU) transmission, and may be transmitted from an AP. The trigger frame may consist of a MAC frame, and may be included in a PPDU.

Some of fields shown in FIG. 13 may be omitted, and another field may be added. In addition, a length of each field may be changed to be different from that shown in the drawing.

A frame control field 1310 of FIG. 13 may include information on a version of a MAC protocol and extra other control information, and a duration field 1320 may include time information for configuring a network allocation vector (NAV) described below or information on a UE identifier (e.g., AID).

In addition, an RA field 1330 includes address information of a receiving STA of a corresponding trigger frame, and may be optionally omitted. A TA field 1340 includes address information of an STA (e.g., AP) transmitting a corresponding trigger frame, and a common information field 1350 includes common control information applied to the receiving STA which receives a corresponding trigger frame.

Figure 14:
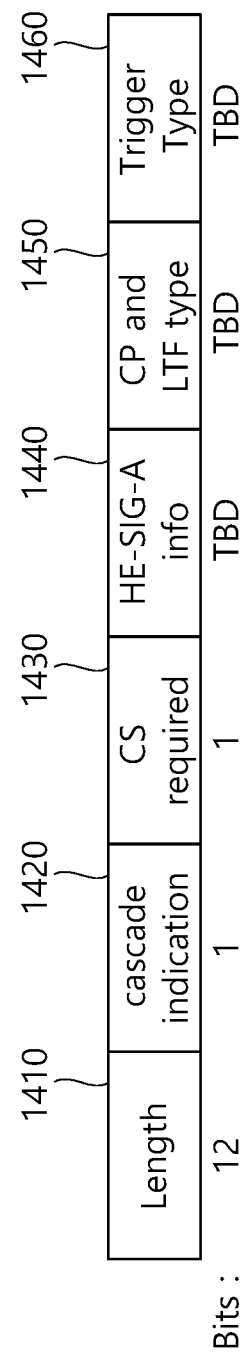
FIG. 14 illustrates an example of a common information field.

FIG. 14 illustrates an example of a common information field. Some of subfields of FIG. 14 may be omitted, and extra subfields may be added. In addition, a length of each of the illustrated subfields may be changed.

A length field 1410 illustrated herein has the same value as a length field of an L-SIG field of an uplink PPDU transmitted in response to a corresponding trigger frame, and the length field of the L-SIG field of the uplink PPDU indicates a length of the uplink PPDU. As a result, the length field 1410 of the trigger frame may be used to indicate a length of a corresponding uplink PPDU.

In addition, a cascade indicator field 1420 indicates whether a cascade operation is performed. The cascade operation implies that downlink MU transmission and uplink MU transmission are performed together within the same TXOP. That is, it implies that the uplink MU transmission is performed when a pre-set time (e.g., SIFS) elapses, after the downlink MU transmission is performed. During the cascade operation, there may be only one transmitting device (e.g., AP) performing downlink communication, and there may be a plurality of transmitting devices (e.g., non-AP) performing uplink communication.

A CS request field 1430 indicates whether it is necessary to consider a radio medium state or an NAV or the like in a situation where a receiving device which has received a corresponding trigger frame transmits an uplink PPDU.

An HE-SIG-A information field 1440 may include information for controlling content of an SIG-A field (i.e., HE-SIG-A field) of an uplink PPDU transmitted in response to a corresponding trigger frame.

A CP and LTF type field 1450 may include information on a CP length and LTF length of an uplink PPDU transmitted in response to a corresponding trigger frame. A trigger type field 1460 may indicate a purpose of using the corresponding trigger frame, for example, typical triggering, triggering for beamforming, a request for block ACK/NACK, or the like.

Meanwhile, the remaining descriptions on FIG. 13 are added as follows.

Per-user information fields 1360 #1 to 1360 #N corresponding to the number of receiving STAs receiving the trigger frame of FIG. 13 are preferably included. The per-user information field may also be called an "RU allocation field".

In addition, the trigger frame of FIG. 13 may include a padding field 1370 and a frame check sequence field 1380.

Each of the per-user information fields 1360 #1 to 1360 #N shown in FIG. 13 preferably includes a plurality of subfields.

Figure 15:
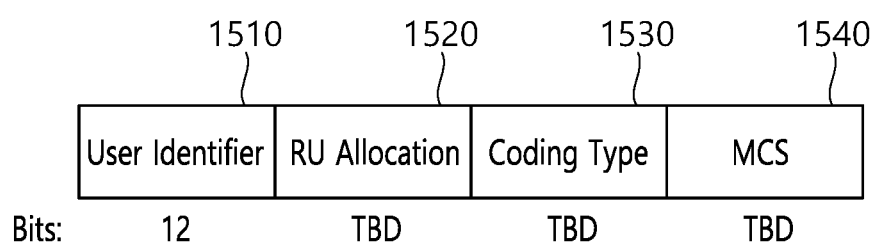
FIG. 15 illustrates an example of a subfield included in a per-user information field.

FIG. 15 illustrates an example of a subfield included in a per-user information field. Some of the subfields of FIG. 15 may be omitted, and extra subfields may be added. In addition, a length of each of the illustrated subfields may be changed.

A user identifier field 1510 of FIG. 15 indicates an identifier of an STA (e.g., a receiving STA) corresponding to per-user information. An example of the identifier may be the entirety or part of an AID.

In addition, an RU allocation field 1520 may be included. That is, when the receiving STA which is identified by using the user identifier field 1510 transmits an uplink PPDU in response to the trigger frame of FIG. 9, the uplink PPDU is transmitted through an RU indicated by the RU allocation field 1520. In this case, the RU indicated by the RU allocation field 1520 preferably indicates the RU shown in FIG. 9, FIG. 10, and FIG. 11.

The subfield of FIG. 15 may include a coding type field 1530. The coding type field 1530 may indicate a coding type of an uplink PPDU transmitted in response to the trigger frame of FIG. 13. For example, when BCC coding is applied to the uplink PPDU, the coding type field 1530 may be set to '1', and when LDPC coding is applied, the coding type field 1530 may be set to '0'.

In addition, the subfield of FIG. 15 may include an MCS field 1540. The MCS field 1540 may indicate an MCS scheme applied to the uplink PPDU transmitted in response to the trigger frame of FIG. 13.

Meanwhile, an STA may transmit various feedback schedules (e.g., buffer status report, channel state information, or the like) based on UL OFDMA random access (UORA) defined according to the IEEE 802.11ax standard.

Figure 16:
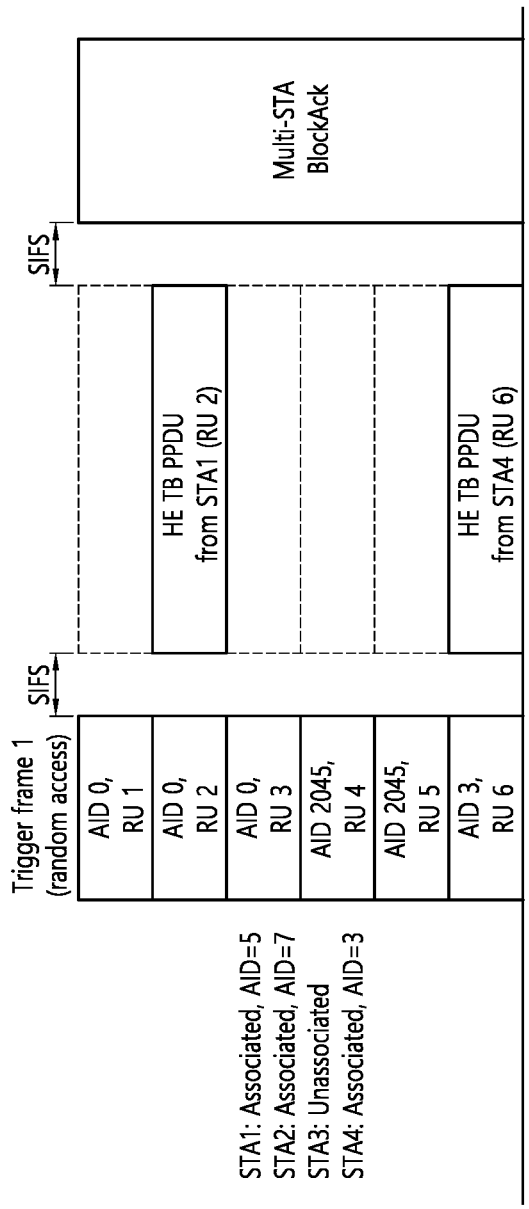
FIG. 16 illustrates a method of performing UORA in a WLAN system.

FIG. 16 illustrates a method of performing UORA in a WLAN system.

As illustrated, an AP may allocate 6 RU resources as shown in FIG. 16 through a trigger frame (e.g., the trigger frame of FIG. 13 to FIG. 15). Specifically, the AP may allocate a $1^{st}$ RU resource (AID 0, RU 1), a $2^{nd}$ RU resource (AID 0, RU 2), a $3^{rd}$ RU resource (AID 0, RU 3), a $4^{th}$ RU resource (AID 2045, RU 4), a $5^{th}$ RU resource (AID 2045, RU 5), and a $6^{th}$ RU resource (AID 2045, RU 6). Information on the AID 0 or AID 2045 may be included, for example, in the user identifier field 1110 of FIG. 11. Information on the RU 1 to RU 6 may be included, for example, in the RU allocation field 1120 of FIG. 11. AID=0 may imply a UORA resource for an associated STA, and AID=2045 may imply a UORA resource for an un-associated STA. Accordingly, the $1^{st}$ to $3^{rd}$ RU resources of FIG. 16 may be used as a UORA resource for the associated STA, the $4^{th}$ and $5^{th}$RU resources may be used as a UORA resource for the un-associated STA, and the $6^{th}$ RU resource of FIG. 16 may be used as a typical resource for UL MU.

In the example of FIG. 16, an OFDMA random access backoff (OBO) of an STA1 is decreased to 0, and the STA1 randomly selects the $2^{nd}$ RU resource (AID 0, RU 2). In addition, since an OBO counter of an STA2/3 is greater than 0, an uplink resource is not allocated to the STA2/3. In addition, regarding an STA4 in FIG. 16, since an AID (e.g., AID=3) of the STA4 is included in a trigger frame, a resource of the RU 6 is allocated without backoff.

Specifically, since the STA1 of FIG. 16 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 16 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 16 is an un-associated STA, the total number of eligible RA RUs for the STA3 is 2 (RU 4, RU 5), and thus the STA3 decreases the OBO counter by 2 but the OBO counter is greater than 0.

Figure 17:
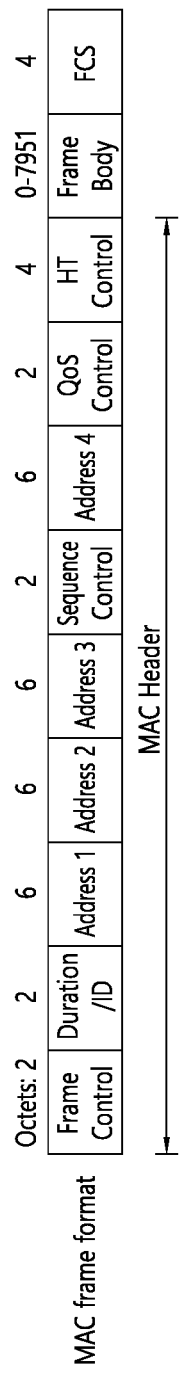
FIG. 17 illustrates an example of a MAC frame.

FIG. 17 illustrates an example of a MAC frame.

The MAC frame of FIG. 17 may be included in a PSDU included in a data field of a PPDU. A length of each of fields shown in FIG. 17 may be changed, and some of the fields may be omitted. As illustrated, the MAC frame may include a MAC header.

The data field may include a service field, a physical layer service data unit (PSDU), and a PPDU tail bit, and may also optionally include a padding bit. Some bits of the service field may be used for synchronization of a descrambler at a receiving end. The PSDU may correspond to a MAC protocol data unit (MPDU) defined in a MAC layer, and may include data generated/used in an upper layer. The PPDU tail bit may be used to return an encoder to a zero state. The padding bit may be used to adjust a length of the data field on a specific unit basis.

The MPDU is defined according to various MAC frame formats, and a basic MAC frame consists of a MAC header, a frame body, and a frame check sequence (FCS). The MAC frame may consist of the MPDU and may be transmitted/received through a PSDU of a data part of the PPDU frame format.

The MAC header includes a frame control field, a duration/ID field, an address field, or the like. The frame control field may include a plurality of pieces of control information required for frame transmission/reception. The duration/ID field may be set to a time for transmitting a corresponding frame or the like.

The duration/ID field included in the MAC header may be set to a 16-bit length (e.g., B0 to B15). Content included in the duration/ID field may vary depending on a frame type and sub-type, whether it is transmitted during a contention free period (CFP), QoS capability of a transmitting STA, or the like. (i) In a control frame of which a sub-type is PS-Poll, the duration/ID field may include an AID of a transmitting STA (e.g., through 14 LSB bits), and 2 MSB bits may be set to 1. (ii) In frames to be transmitted during CFP by a point coordinator (PC) or a non-QoS STA, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, when it is set to B15=0 in the duration/ID field, it may indicate that the duration/ID field is used to indicate a TXOP duration, and B0 to B14 may be used to indicate a real TXOP duration in practice. The real TXOP duration indicated by the B0 to B14 may be any one of values 0 to 32767, and a unit thereof may be microseconds (us). However, when the duration/ID field indicates a fixed TXOP duration value (e.g., 32768), it may be set to B15=1 and B0~B14=0. In addition, when it is set to B14=1 and B15=1, the duration/ID field is used to indicate an AID, and B0 to B13 indicate one of AIDs 1 to 2007.

The frame control field of the MAC header may include Protocol Version, Type, Subtype, To DS, From DS, More Fragment, Retry, Power Management, More Data, Protected Frame, and Order subfields.

The STA (AP and/or non-AP STA) of the present specification may support multi-link communication. The STA supporting multi-link communication may perform communication simultaneously through a plurality of links. That is, the STA supporting multi-link communication may perform communication through the plurality of links during a first time period, and may perform communication through only any one of the plurality of links during a second time period.

The multi-link communication may imply communication supporting the plurality of links, and the link may include one channel (e.g., 20/40/80/160/240/320 MHz channel) defined in a 2.4 GHz band, a 5 GHz band, a 6 GHz band, and a specific band defined in a specific band. Hereinafter, various bands and channels will be described.

Figure 18:
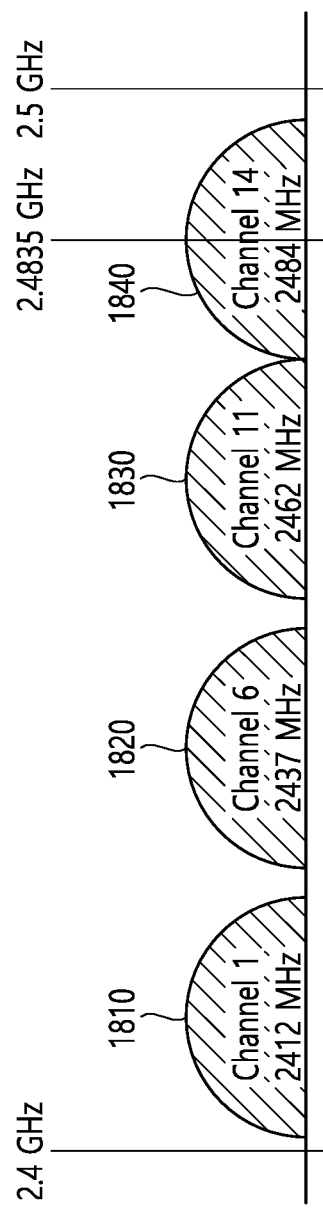
FIG. 18 illustrates an example of a channel used/supported/defined within a 2.4 GHz band.

FIG. 18 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N)GHz. The channel index may be called in various terms such as a channel number or the like. Specific numerical values of the channel index and center frequency may be changed.

FIG. 18 exemplifies 4 channels within a 2.4 GHz band. Each of $1^{st}$ to $4^{th}$ frequency domains 1810 to 1840 shown herein may include one channel. For example, the $1^{st}$ frequency domain 1810 may include a channel 1 (a 20 MHz channel having an index 1). In this case, a center frequency of the channel 1 may be set to 2412 MHz. The $2^{nd}$ frequency domain 1820 may include a channel 6. In this case, a center frequency of the channel 6 may be set to 2437 MHz. The $3^{rd}$ frequency domain 1830 may include a channel 11. In this case, a center frequency of the channel 11 may be set to 2462 MHz. The $4^{th}$ frequency domain 1840 may include a channel 14. In this case, a center frequency of the channel 14 may be set to 2484 MHz.

Figure 19:
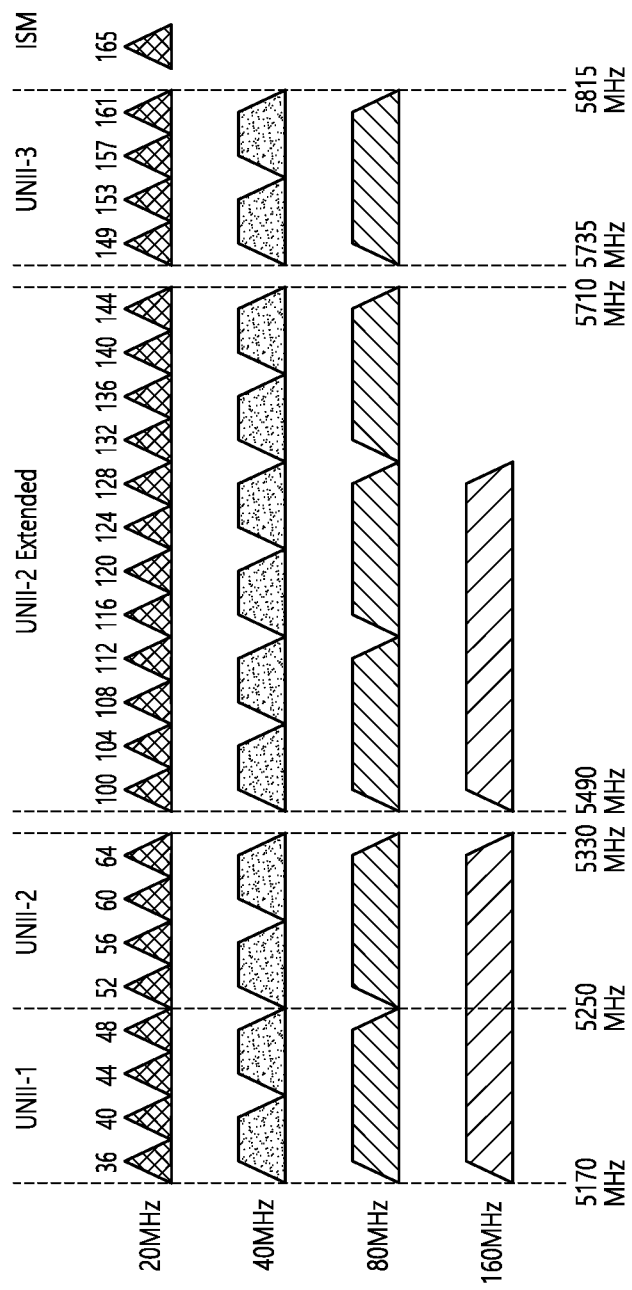
FIG. 19 illustrates an example of a channel used/supported/defined within a 5 GHz band.

FIG. 19 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 19 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 20:
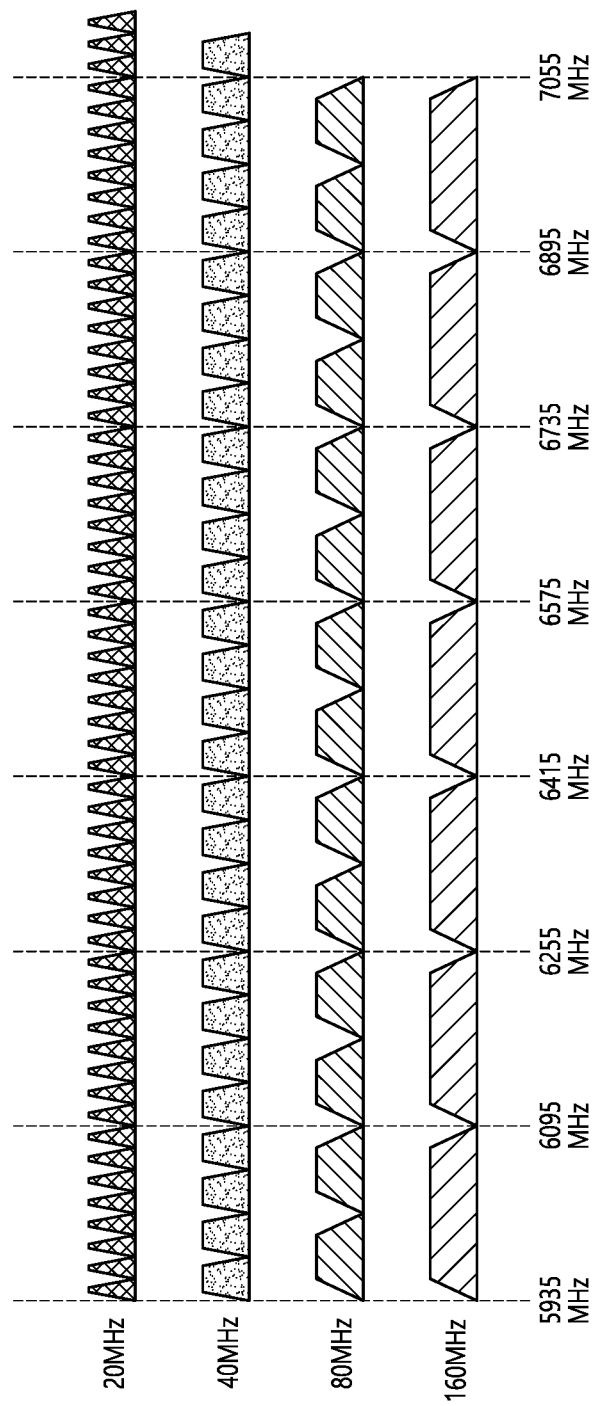
FIG. 20 illustrates an example of a channel used/supported/defined within a 6 GHz band.

FIG. 20 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 20 may be changed.

For example, the 20 MHz channel of FIG. 20 may be defined starting from 5.940 GHz. Specifically, among 20 MHz channels of FIG. 20, a leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 20 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 20 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 20, a 240 MHz channel or a 320 MHz channel may be additionally added.

Hereinafter, the concept of channel bonding will be described.

For example, in an IEEE 802.11n system, 40 MHz channel bonding may be performed by coupling two 20 MHz channels. In addition, in an IEEE 802.11ac system, 40/80/160 MHz channel bonding may be performed.

For example, an STA may perform channel bonding for a primary 20 MHz channel (P20 channel) and a secondary 20 MHz channel (S20 channel). A backoff count/counter may be used in a channel bonding process. A backoff count value may be selected as a random value, and may be decreased during a backoff interval. In general, when the backoff count value is 0, the STA may attempt an access to a channel.

The STA which performs channel bonding determines whether the S20 channel has maintained an idle state during a specific period (e.g., point coordination function interframe space (PIFS)), at a timing at which a backoff count value for the P20 channel is 0 since it is determined that the P20 channel is in the idle state during the backoff interval. If the S20 channel is in the idle state, the STA may perform bonding for the P20 channel and the S20 channel. That is, the STA may transmit a signal (PPDU) through the 40 MHz channel (i.e., 40 MHz bonding channel) including the P20 channel and the S20 channel.

Figure 21:
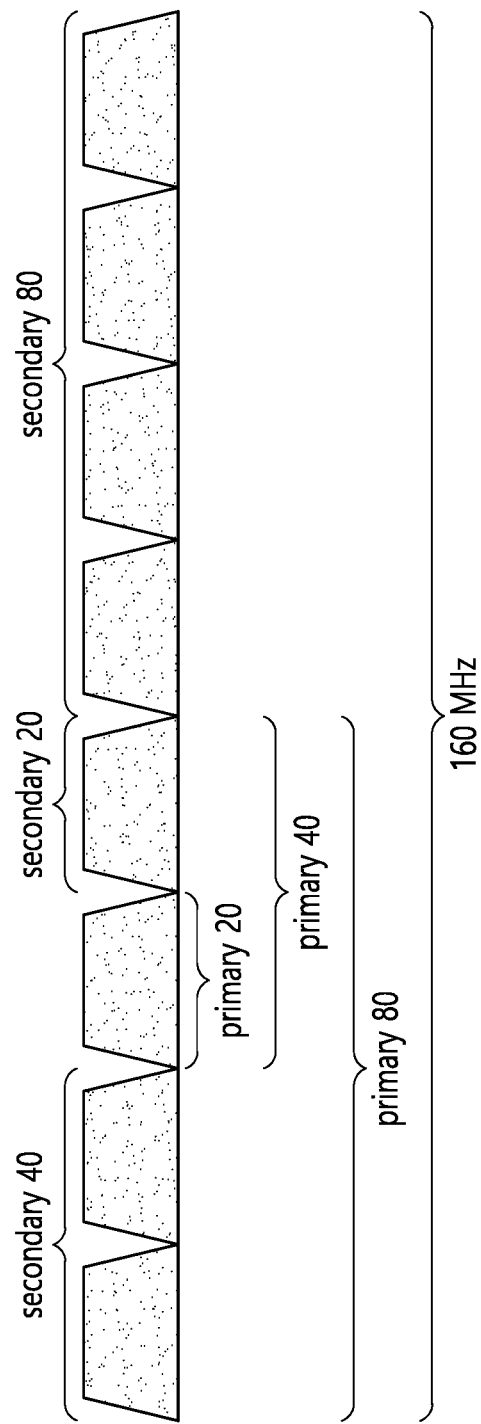
FIG. 21 illustrates an example of channel bonding.

FIG. 21 illustrates an example of channel bonding. As shown in FIG. 21, a primary 20 MHz channel and a secondary 20 MHz channel may configure a 40 MHz channel (primary 40 MHz channel) through channel bonding. That is, the bonded 40 MHz channel may include the primary 20 MHz channel and the secondary 20 MHz channel.

The channel bonding may be performed when a channel consecutive to the primary channel is in an idle state. That is, the primary 20 MHz channel, the secondary 20 MHz channel, a secondary 40 MHz channel, and a secondary 80 MHz channel may be bonded sequentially. If it is determined that the secondary 20 MHz channel is in a busy state, the channel bonding may not be performed even if all other secondary channels are in the idle state. In addition, if it is determined that the secondary 20 MHz channel is in the idle state and the secondary 40 MHz channel is in the busy state, the channel bonding may be performed only for the primary 20 MHz channel and the secondary 20 MHz channel.

Hereinafter, a technical feature for multi-link and aggregation will be described.

An STA (AP and/or non-AP STA) of the present specification may support multi-link communication. That is, the STA may transmit/receive a signal simultaneously through a first link and a second link, based on the multi-link. That is, the multi-link may imply a scheme in which one STA transmits/receives a signal simultaneously through a plurality of links. For example, transmitting of a signal through any one link and receiving of a signal through another link may also be included in multi-link communication. An STA supporting a multi-link may use a plurality of links in a first time period, and may use only one link in a second time period.

Figure 22:
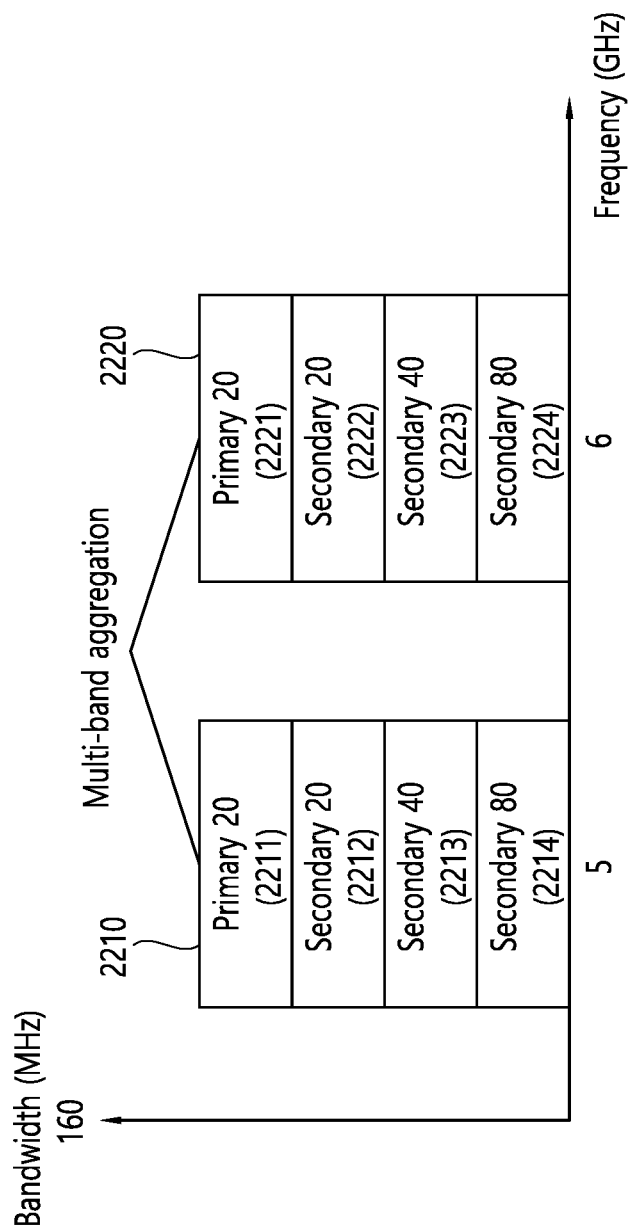
FIG. 22 illustrates a technical feature of a link used in a multi-link.

FIG. 22 illustrates a technical feature of a link used in a multi-link.

A link used in a multi-link may have at least one of technical features as follows. A feature regarding a link described below is for exemplary purposes, and an additional technical feature is also applicable.

For example, respective links used in the multi-link may be included in different bands. That is, when the multi-link in use supports first and second links, each of the first and second links is included within a 2.4 GHz band, a 5 GHz band, or a 6 GHz band, but the first link and the second link may be included in different bands.

Referring to FIG. 22, a first link 2210 and a second link 220 may be used for the multi-link. The first link 2210 of FIG. 22 may be included, for example, in the 5 GHz band. The second link 2220 of FIG. 22 may be included, for example, in the 6 GHz band.

Each of the links included in the multi-link may also be included in the same band. For example, when the multi-link in use supports the first/second/third links, all of the links may be included in the same band, or the first/second links may be included in a first band and the third link may be included in a second band.

The multi-link may be configured based on different RF modules (e.g., a transmitting/receiving device including an IDFT/IFFT/DFT/FFT block and a baseband processing device). Additionally or alternatively, a plurality of links included in the multi-link may be discontinuous in a frequency domain. That is, among the plurality of links, a frequency gap may exist in a frequency domain corresponding to the first link and a frequency domain corresponding to the second link.

As shown in FIG. 22, the first link 2210 may include a plurality of channels 2211, 2212, 2213, and 2214. An STA may apply the existing channel bonding to the plurality of channels 2211, 2212, 2213, and 2214. That is, when the plurality of channels 2211, 2212, 2213, and 2214 are in an idle state during a specific time period (e.g., during a PIFS), the plurality of channels 2211, 2212, 2213, and 2214 may consist of a single bonding channel, and the single bonding channel may operate through the single link 2210. Alternatively, some channels (e.g., 2211, 2212, and 2214) among the plurality of channels 2211, 2212, 2213, and 2214 may operate through the single link 2210 according to a preamble puncturing scheme newly proposed in the IEEE 802.11ax standard. The aforementioned feature may be equally applied to the second link 2220.

The number (and/or a maximum bandwidth) of channels included in a single link used in the multi-link may have an upper limit. For example, up to four channels may configure the single link as in the example of FIG. 22. Additionally or alternatively, a maximum bandwidth of the single link may be 160 MHz, 240 MHz, or 320 MHz. Additionally or alternatively, the single link may include only continuous channels. A specific numerical value mentioned above may be changed.

A procedure of identifying/specifying/determining a link used in the multi-link relates to an aggregation (or channel aggregation) procedure. The STA may aggregate a plurality of links to perform multi-link communication. That is, the STA may perform: 1) a first procedure of identifying/specifying/determining links aggregated for the multi-link; and 2) a second procedure of performing multi-link communication through the identified/specified/determined links. The STA may perform the first and second procedures as a separate procedure, or may perform the procedures simultaneously as a single procedure.

Hereinafter, a technical feature for the first procedure will be described.

An STA may transmit/receive information on a plurality of links constituting a multi-link. For example, through a beacon, a probe response, an association response, or an extra control frame, an AP may transmit identification information regarding a band in which capability of the multi-link is supported and/or identification information regarding a channel in which capability of the multi-link is supported. For example, when the AP can perform communication by aggregating some channels within a 5 GHz band and some channels within a 6 GHz band, identification information regarding channels that can be aggregated may be transferred to a user STA.

For example, through a probe request, an association response, or an extra control frame, the user STA may also transmit identification information regarding a band in which capability of the multi-link is supported and/or identification information regarding a channel in which capability of the multi-link is supported. For example, when the user STA can perform communication by aggregating some channels within a 5 GHz band and some channels within a 6 GHz band, identification information regarding channels that can be aggregated may be transferred to the AP.

Any one of the plurality of links constituting the multi-link may operate as a primary link. The primary link may perform various functions. For example, when a backoff value of the primary link is 0 (and/or the primary link is idle during a PIFS), an STA may aggregate other links. Information regarding the primary link may also be included in the beacon, the probe request/response, and the association request/response.

The user-STA/AP may specify/determine/obtain a band and/or channel in which the multi-link is performed through a negotiation procedure of exchanging information regarding capability thereof.

For example, through the negotiation procedure, the STA may specify/determine/obtain a first candidate band/channel that can be used for a first link, a second candidate band/channel that can be used for a second link, and a third candidate band/channel that can be used for a third link.

Thereafter, the STA may perform the procedure of identifying/specifying/determining links aggregated for the multi-link. For example, the STA may aggregate at least two bands/channels, based on a backoff count of the first candidate band/channel, second candidate band/channel, and third candidate band/channel and/or a clear channel assessment (CCA) sensing result (whether it is busy/idle). For example, the STA may aggregate the second candidate band/channel which has maintained an idle state during a specific period (during a PIFS), at a timing at which the backoff count value of the first candidate band/channel is 0. That is, the STA may determine/specify the first candidate band/channel as the first link for the multi-link, may determine/specify the second candidate band/channel as the second link for the multi-link, and may perform multi-link communication through the first and second links.

Hereinafter, a technical feature for the second procedure will be described.

For example, when an STA determines to aggregate the first and second links, the STA may perform multi-link communication through the first and second links. For example, the STA may transmit a PPDU of the same length through all of the first and second links. Alternatively, the STA may receive a transmission PPDU through the first link, and may receive a reception PPDU through the second link during an overlapping time period. The STA may perform communication through all aggregated links in a specific time period, and may use only any one link in another time period.

An STA (user-STA/AP) of the present specification may include a plurality of RF modules/units. For example, when the STA transmits a signal of a 2.4 GHz band by using the RF module/unit for a 5 GHz and/or 6 GHz band, performance deterioration may occur in the STA. Therefore, the STA may additionally include the RF module/unit for the 2.4 GHz band, distinct from the RF module/unit for the 5 GHz and/or 6 GHz band.

As described above, the STA of the present specification can operate in various bands/channels. Accordingly, an operation of transferring accurate information regarding a band and/or channel shall be defined for the user-STA/AP.

For this, the present specification proposes a plurality of embodiments.

At least one (e.g., a first embodiment) of the following examples proposes an example in which an AP informs an STA of a multi-band channel or an ultra-wideband channel greater than or equal to 160 MHz. Specifically, the present specification proposes an EHT operation element transmitted through a beacon frame, a probe response frame, or an association response frame. The EHT operation element proposed in the present specification may be a format based on the IEEE 802.11be standard. The EHT operation element may support a technical feature described below.

Since the at least one (e.g., the first embodiment) of the following examples is related to an example for informing of a multi-band channel or an ultra-wideband channel greater than or equal to 160 MHz, the following technical feature is not limited to the term EHT. That is, the term EHT may be changed/omitted, and the EHT operation element may be called in various terms such as a new type operation element, a first type operation element, or the like. For example, the following technical feature may be applied to the EHT standard or a new WLAN standard enhanced from IEEE 802.11be.

First Embodiment

Hereinafter, for convenience of explanation, a related technical feature will be described based on an EHT operation element.

An AP (or a transmitting STA) may define information on an operating channel with respect to a specific element. That is, the element may include information on a channel in which the AP operates. The element may be transmitted to an STA by being included in a beacon frame transmitted periodically from the AP. The STA may identify the information on the operating channel of the AP by receiving the beacon frame. In addition, when the STA requests the AP to provide channel-related information or connection in a state where the element is included in a probe response frame or an association response frame or the like, the element may be transmitted to the STA in response to the request.

In the IEEE 802.11n standard, 40 MHz channel information may be defined through the HT operation element. In addition, in the IEEE 802.11ac, information on an 80 MHz or 160 MHz channel may be defined through the VHT operation element. Since wideband channel transmission is not explicitly specified in the IEEE 802.11ax standard, the HE operation element may not include information on the existing band/channel. However, since the IEEE 802.11ax supports a 6 GHz band operation, the HE operation element may include information on a channel in a 6 GHz band, instead of the information on the existing band channel. An STA (e.g., EHT-STA) supporting a subsequent standard (e.g., IEEE 803.11be) after IEEE 802.11ax may support an ultra-wideband channel greater than or equal to 160 MHz. In addition, the EHT-STA may transmit a signal through a channel within a plurality of bands (e.g., 2.4 GHz or 5 GHz) or may transmit a signal through a plurality of links. For example, one BSS may use an up to 200 MHz channel by using a 40 MHz channel in a 2.4 GHz band and a 160 MHz channel in a 5 GHz band together.

An AP and/or STA according to the present specification may include 4 RF units, and may operate in 3 bands of 2.4 GHz, 5 GHz, and 6 GHz. The number of RF units or the number of supported bands may be changed. According to an embodiment, the AP and/or the STA may include 4 or more RF units. The AP and/or STA of the present specification may operate in at least one band among 2.4 GHz, 5 GHz, 6 GHz, 60 GHz, and 900 MHz, or may also operate in other bands.

The present specification relates to a situation in which several channels are supported within one BSS. In this case, the STA may transmit/receive a signal through one or more of the several channels. That is, the AP and/or STA within the BSS may support a plurality of channels. The STA may transmit a signal through at least one channel among the plurality of channels supported by the AP. At least one channel among the plurality of channels may also be called in various terms such as a link, a session, a connection, or the like.

An EHT operation element may include operating channel information of the AP. The EHT operation element may include information on at least one channel within a first band in which an EHT standard is supported. A VHT operation element may include information on at least one channel within a second band in which a VHT standard is supported. An HT operation element may include an HT operation element including information on at least one channel within a third band in which an HT standard is supported. According to an embodiment, the first band may include the aforementioned 6 GHz band. The second band may include the aforementioned 5 GHz band. The third band may include the aforementioned 2.4 GHz band.

According to an embodiment, when the BSS operates in the 5 GHz and 6 GHz bands, the HT operation element may include 40 MHz channel information within 5 GHz (e.g., information on a primary 20 MHz channel and information on a secondary 20 MHz channel). The VHT operation element may include an 80 MHz or 160 MHz channel within 5 GHz. The EHT operation element may include channel information within the 6 GHz band. For example, when an AP (or a transmitting STA) uses a channel 42 (80 MHz) and a channel 155 (80 MHz) within a 5 GHz band and uses a channel 7 (80 MHz) within a 6 GHz band, information of the channel 7 within the band 6 GHz may be included in the EHT operation element. Since a VHT-STA and an HE-STA may operation in a channel within a 5 GHz band of a corresponding BSS, the VHT operation element may include channel information within the 5 GHz band in which the VHT-STA and the HE-STA operate. Therefore, information on two channels (the channel 42 and the channel 155) within the 5 GHz band may be included in the VHT operation element. Since the HE-STA may operate in the 40 MHz channel within a 5 GHz band of a corresponding BSS, the HE operation element may include information of a band in which the HT-STA can operate. The HE operation element may include primary 20 MHz channel and primary 40 MHz channel information within the 5 GHz band in which the HT-STA operates.

In order to ensure backward compatibility with the existing STA, the EHT-STA may transmit the HT operation element and the VHT operation element together with the EHT operation element. Therefore, the EHT-STA may transmit only information not included in the HT operation element and the VHT operation element to another STA by allowing the EHT operation element to include the information. The information transmitted by the EHT-STA by being included in the EHT operation element may be information which does not overlap with the HT operation element and VHT operation element. Accordingly, an overhead can be reduced.

Figure 23:
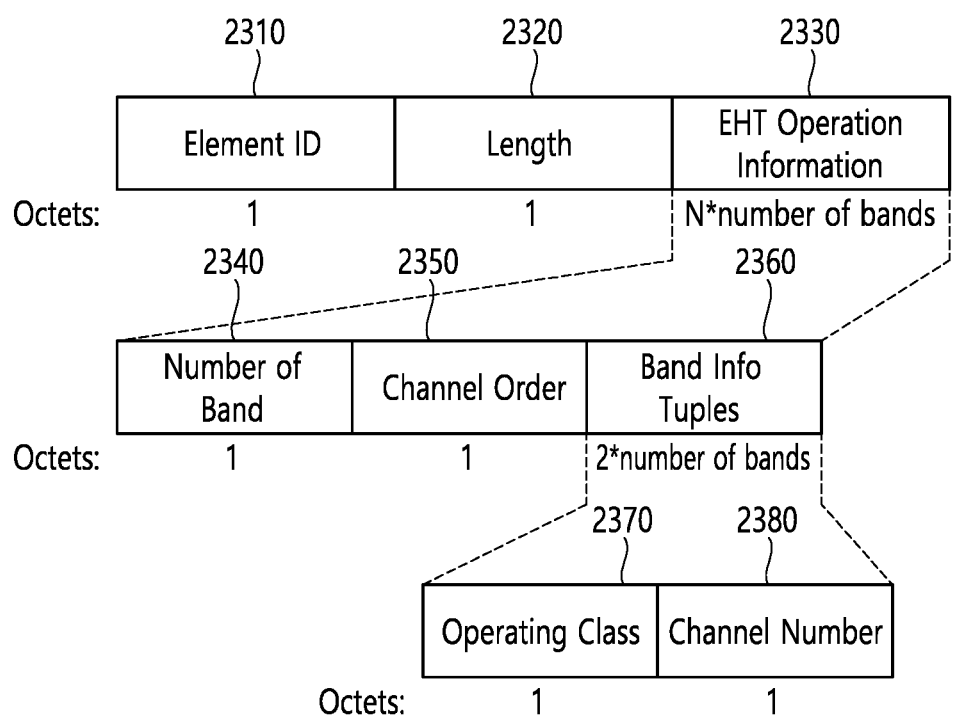
FIG. 23 illustrates a first format of an EHT operation element.
Figure 24:
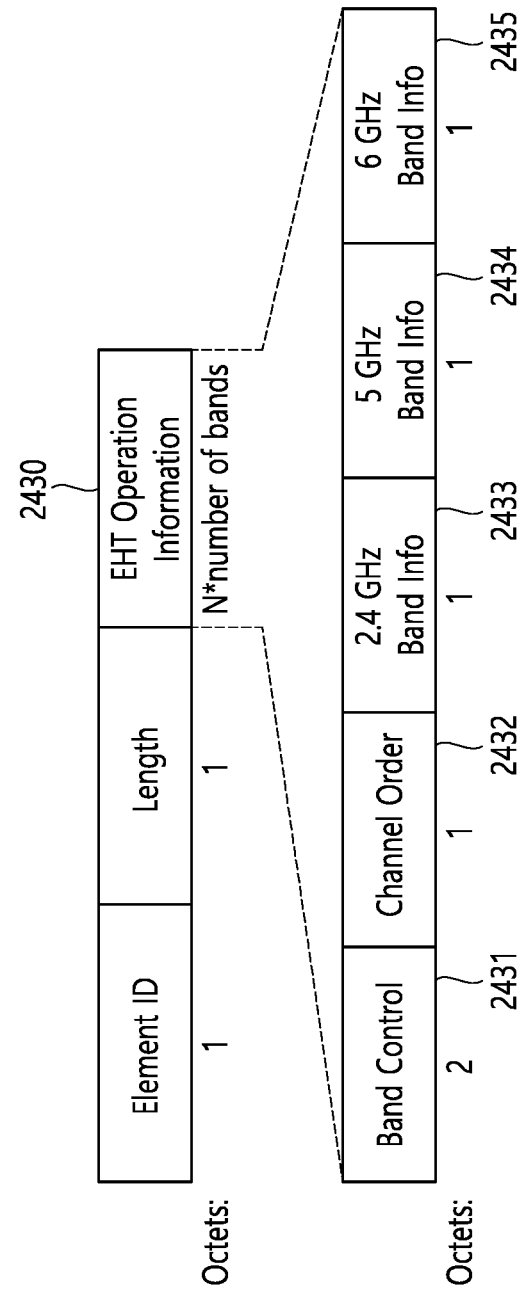
FIG. 24 illustrates a second format of an EHT operation element.

FIG. 23 may illustrate a first format of an EHT operation element, and FIG. 24 may illustrate a second format of the EHT operation element. FIG. 23 may illustrate a format for defining information on a band or RF not included in an operation element (e.g., a VHT operation element or an HR operation element) conforming to the conventional standard by dividing the information for each band or RF. FIG. 24 may illustrate a format for defining information on all bands or RFs, not included in the operation element conforming to the conventional standard, at a time.

FIG. 23 illustrates a first format of the EHT operation element.

Specifically, the EHT operation element may include an Element ID field 2310, a Length field 2320, or an EHT Operation Information field 2330. The Element ID field 2310 may include information on an element ID. The Length field 2320 may include information on the number of octets after the Length field 2320.

The EHT Operation Information field 2330 may include a Number of Band field 2340, a Channel Order field 2350, and/or a Band Info Tuples field 2360.

The Number of Band field 2340 may include information on the number of bands or RFs not included in the VHT operation element among the numbers of all bands or all RFs of a BSS. For example, an AP may use a channel 42 (80 MHz) and a channel 155 (80 MHz) within a 5 GHz band, and may use a channel 7 (80 MHz) within a 6 GHz band. The VHT operation element may include information on the channel 42 and the channel 155 within the 5 GHz band. Therefore, the EHT operation element may include only information on one channel 7 within the 6 GHz band. The Number of Band field 2340 in the EHT Operation Information field 2330 may have a first value (e.g., {1}).

The Channel Order field 2350 may include information on a location of a primary channel. The Channel Order field 2350 may indicate the information on the location of the primary channel in various manners. For example, the Channel Order field 2350 may indicate a primary 20 MHz channel within 160 MHz through a bitmap.

The Band Info Tuples field 2360 may include information on each band or RF. Specifically, the Band Info Tuples field 2360 may be configured repeatedly to indicate information on the band or RF, except for channel information included in the VHT operation element. For example, the AP may transmit information on 2 RFs through the EHT operation element, except for the channel information included in the VHT operation element. Therefore, the Band Info Tuples field 2360 may be configured by being repeated 2 times.

The Band Info Tuples field 2360 may include an Operating Class subfield 2370 or a Channel number subfield 2380.

The Operating Class subfield 2370 may include information on an operating class (or operation class) of each band or RF. It may be defined that an index indicating one set among sets of rules applied to a wireless device corresponds to one operating class. For example, one set of the rules may consist of a channel starting frequency, a channel spacing, a channel set, and a behavior limit set. The operating class may be configured differently for each country. For example, the AP may use the channel 42 (80 MHz) and the channel 155 (80 MHz) within the 5 GHz band, and may use the channel 7 (80 MHz) within the 6 GHz band. The VHT operation element may include information of an operating class indicating the channel 42 and the channel 155 within the 5 GHz band. Therefore, the Operating Class subfield 2370 in the Band Info Tuples field 2360 may have a value (e.g., {133}) for indicating the 80 MHz channel within the 6 GHz band.

The Channel number subfield 2380 may include information on a channel number of each band or RF. For example, the AP may use the channel 42 (80 MHz) and the channel 155 (80 MHz) within the 5 GHz band, and may use the channel 7 (80 MHz) within the 6 GHz band. The VHT operation element may include information on the channel 42 and the channel 155 within the 5 GHz band. Therefore, the Channel number subfield 2380 in the Band Info Tuples field 2360 may have a value (e.g., {7}) for indicating the channel 7.

FIG. 24 illustrates a second format of the EHT operation element.

The EHT operation element may include operating channel information of an AP. Unlike the first format shown in FIG. 23, the second format may be a format for defining information on all bands or RFs, not included in the VHT operation element, at a time.

An EHT Operation Information field 2430 may include a Band Control field 2431, a Channel Order field 2432, a 2.4 GHz Band Info field 2433, a 5 GHz Band Info field 2434, or a 6 GHz Band Info field 2435.

The Band Control field 2431 may include information on a band or RF of a current BSS, except for channel information included in the VHT operation element. The Band Control field 2431 may include information on a combination of bands or RFs within 2.4 GHz, 5 GHz or 6 GHz, except for channel information included in the operation element conforming to the conventional standard. For example, when the BSS operates in 4 RFs and 3 bands, there may be about 50 types of the combination of bands or RFs. A value of the Band Control field 2431 may be configured with a lookup table according to the combination of bands or RFs. For example, the value of the Band Control field 2431 may be configured with 8 bits. When the value of the Band Control field 2431 is {2}, that is, {00000010}, it may indicate that 2 RFs are present for the 5 GHz band, and 2 RFs are present for the 6 GHz band. According to an embodiment, the AP may transmit to a receiving STA a mapping relation between the RF and the band through the Band Control field 2431. The receiving STA may determine an optimal mapping relation between the RF and the band from the AP to communicate with the AP, based on the received mapping relation between the RF and the band.

The Channel Order field 2432 may include information on a location of a primary channel. The primary channel may imply a specific frequency domain in which a beacon (or an extra control frame) can be transmitted. The Channel Order field 2432 may include the information on the location of the primary channel in various manners. For example, the Channel Order field 2432 may indicate a primary 20 MHz channel within 160 MHz through a bitmap.

The 2.4 GHz Band Info field 2433 may include information on a 2.4 GHz band. Specifically, the 2.4 GHz Band Info field 2433 may include information on a channel number and information on a channel width within the 2.4 GHz band.

The 5 GHz Band Info field 2434 may include information on a 5 GHz band. Specifically, the 5 GHz Band Info field 2434 may include information on a channel number and information on a channel width within the 5 GHz band.

The 6 GHz Band Info field 2435 may include information on a 6 GHz band. Specifically, the 6 GHz Band Info field 2435 may include information on a channel number and information on a channel width within the 6 GHz band.

Information on a channel number, which is included in the 2.4 GHz Band Info field 2433, the 5 GHz Band Info field 2434, and the 6 GHz Band Info field 2435, may include information on a center frequency and channel width (or a frequency domain (e.g., 20 MHz)) described in FIG. 9 and FIG. 10. However, the information on the channel number may be defined differently for each country, and may not include information on the channel width. Therefore, the 2.4 GHz Band Info field 2433, the 5 GHz Band Info field 2434, and the 6 GHz Band Info field 2435 may include not only the information on the channel number but also the information on the channel width.

According to an embodiment, the second format of the EHT operation element may further include information on an operating class in order to transmit information on a regulation related to a channel (e.g., transmit (TX) power).

Hereinafter, another format of the EHT operation element will be described.

The EHT operation element may include every operating channel information of an AP, unlike in FIG. 23 and FIG. 24. For example, when the AP is currently using a channel 42 (80 MHz) and a channel 155 (80 MHz) in a 5 GHz band and a channel 7 (80 MHz) in a 6 GHz band, the EHT operation element may include every information on three 80 MHz channels (240 MHz in total) and two bands (5 GHz and 6 GHz).

The VHT operation element may include information on a band in which the VHT-STA and the HE-STA can operate. Therefore, information included in the EHT operation element may be included in the VHT operation element in a partially overlapping manner.

The EHT operation element may be newly configured separately from the VHT operation element or the HT operation element, and thus may support all combinations of bands or RFs capable of operating in the EHT-STA. For example, when the AP uses three 80 MHz channels in the 5 GHz band or uses three bands of 2.4 GHz, 5 GHz and 6 GHz, the AP may indicate information on all channels through the EHT operation element.

Figure 25:
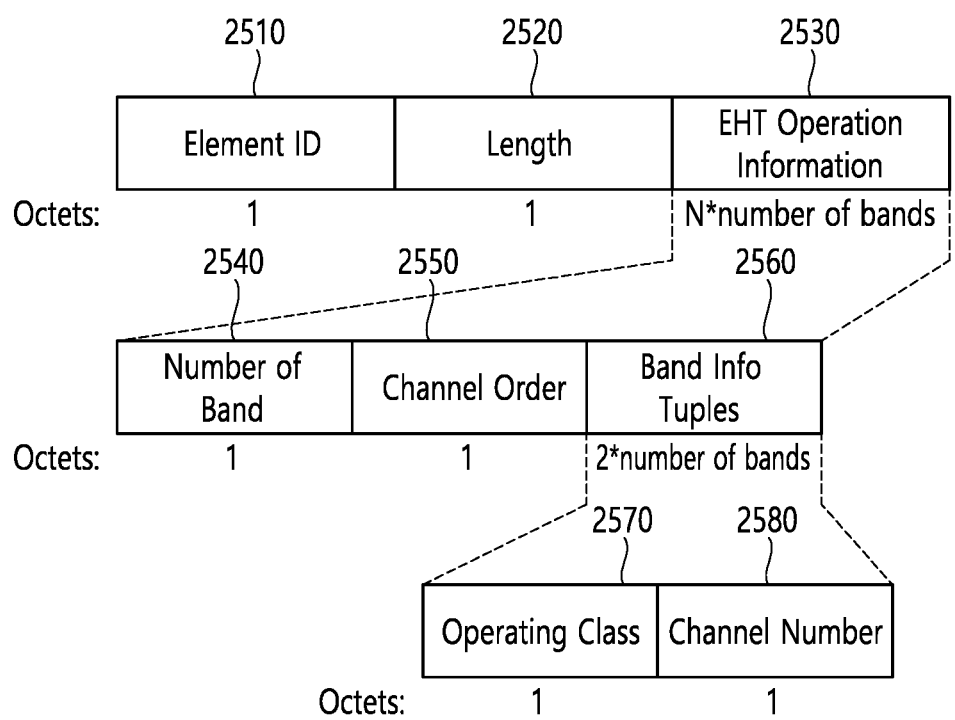
FIG. 25 illustrates a third format of an EHT operation element.
Figure 26:
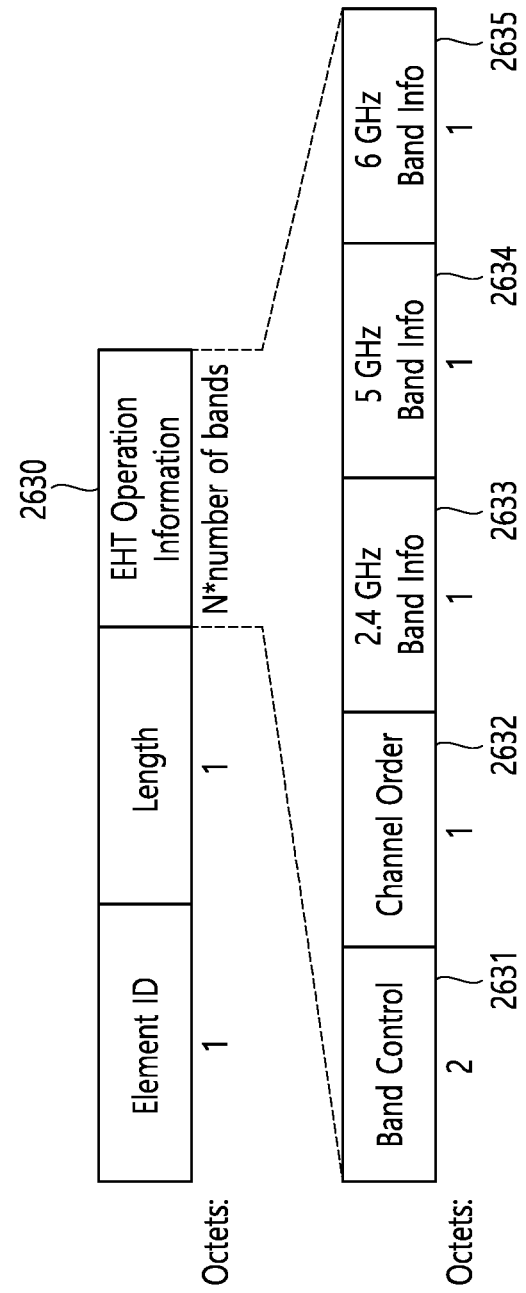
FIG. 26 illustrates a fourth format of an EHT operation element.

FIG. 25 may illustrate a third format of the EHT operation element, and FIG. 26 may illustrate a fourth format of the EHT operation element. FIG. 25 may illustrate a format for defining information on a band or RF by dividing the information for each band or RF. FIG. 26 may illustrate a format for defining information on all bands or RFs at a time.

FIG. 25 illustrates a third format of the EHT operation element.

Specifically, the EHT operation element may include an Element ID field 2510, a Length field 2520, or an EHT Operation Information field 2530. The Element ID field 2510 may include information on an element ID. The Length field 2520 may include information on the number of octets after the Length field 2520.

The EHT Operation Information field 2530 may include a Number of Band field 2540, a Channel Order field 2550, or a Band Info Tuples field 2560.

The Number of Band field 2540 may include information on the number of all bands or all RFs of a BSS. For example, an AP may use a channel 42 (80 MHz) and a channel 155 (80 MHz) within a 5 GHz band, and may use a channel 7 (80 MHz) within a 6 GHz band. Since the channel 42 and the channel 155 are discontinuous in the 5 GHz band, the AP may preferably include 2 RFs. In addition, in order to transmit a signal of the channel 7 in the 6 GHz band, the AP may include additional one RF. That is, the AP may include 3 RFs in total. Therefore, the Number of Band field 2540 in the EHT Operation Information field 2530 may have a first value (e.g., {3}).

The Channel Order field 2550 may include information on a location of a primary channel. The Channel Order field 2550 may indicate the information on the location of the primary channel in various manners. For example, the Channel Order field 2550 may indicate a primary 20 MHz channel within 160 MHz through a bitmap.

The Band Info Tuples field 2560 may include information on the number of bands or RFs. Specifically, the Band Info Tuples field 2560 may be configured repeatedly to indicate information on the number of all bands or RFs. For example, the AP may use a channel 42 (80 MHz) and a channel 155 (80 MHz) within the 5 GHz band, and may use a channel 7 (80 MHz) within the 6 GHz band. In order for the AP to use the channel 42 and the channel 155 within the 5 GHz band and use the channel 7 within the 6 GHz band, 3 RFs may be required. Therefore, the Band Info Tuples field 2560 may be configured by being repeated 3 times.

The Band Info Tuples field 2560 may include an Operating Class subfield 2570 or a Channel Number subfield 2580.

The Operating Class subfield 2570 may include information on an operating class of each band or RF. For example, the AP may use the channel 42 (80 MHz) and the channel 155 (80 MHz) within the 5 GHz band, and may use the channel 7 (80 MHz) within the 6 GHz band. In order for the AP to use the channel 42 and the channel 155 within the 5 GHz band and use the channel 7 within the 6 GHz band, 3 RFs may be required. Therefore, the Band Info Tuples field 2560 may be configured by being repeated 3 times. The Band Info Tuples field 2560 may include a first Band Info Tuples field, a second Band Info Tuples field, and a third Band Info Tuples field. Therefore, a first Operating Class subfield in the first Band Info Tuples including information on the channel 42 may have a value (e.g., {128}) for indicating an 80 MHz channel within the 5 GHz band. A second Operating Class subfield in the second Band Info Tuples including information on the channel 155 may have a value (e.g., {128}) for indicating an 80 MHz channel within the 5 GHz band. A third Operating Class subfield in the third Band Info Tuples including information on the channel 7 may have a value (e.g., {133}) for indicating an 80 MHz channel within the 6 GHz band.

The Channel Number subfield 2580 may include information on a channel number of each band or RF. For example, the AP may use the channel 42 (80 MHz) and the channel 155 (80 MHz) within the 5 GHz band, and may use the channel 7 (80 MHz) within the 6 GHz band. The Band Info Tuples field 2560 may include a first Band Info Tuples field, a second Band Info Tuples field, and a third Band Info Tuples field. Therefore, a first Channel number subfield in the first Band Info Tuples field may have a value (e.g., {42}) for indicating the channel 42 within the 5 GHz band. A second Channel number subfield in the second Band Info Tuples field may have a value (e.g., {155}) for indicating the channel 155 within the 5 GHz band. A third Channel number subfield in the third Band Info Tuples field may have a value (e.g., {7}) for indicating the channel 7 within the 6 GHz band.

FIG. 26 illustrates a fourth format of the EHT operation element.

The EHT operation element may include operating channel information of an AP. Unlike the third format shown in FIG. 25, the fourth format may be a format for defining information on all bands or RFs at a time.

An EHT Operation Information field 2630 may include a Band Control field 2631, a Channel Order field 2632, a 2.4 GHz Band Info field 2633, a 5 GHz Band Info field 2634, or a 6 GHz Band Info field 2635.

The Band Control field 2631 may include information on a band or RF of a current BSS. The Band Control field 2631 may include information on a combination of bands or RFs within 2.4 GHz, 5 GHz or 6 GHz. For example, when the BSS operates in 4 RFs and 3 bands, there may be about 100 types of the combination of bands or RFs. A value of the Band Control field 2631 may be configured with a lookup table according to the combination of bands or RFs. For example, the value of the Band Control field 2631 may be configured with 8 bits. When the value of the Band Control field 2631 is {1}, that is, {00000001}, it may indicate that 2 RFs are present for the 5 GHz band, and 2 RFs are present for the 6 GHz band. As another example, when the value of the Band Control field 2631 is {5}, i.e., {00000101}, it may indicate that one RF is present for the 5 GHz band, and 3 RFs are present for the 6 GHz band.

The Channel Order field 2632 may correspond to the Channel Order field 2432 of FIG. 24.

The 2.4 GHz Band Info field 2633, the 5 GHz Band Info field 2634, and the 6 GHz Band Info field 2635 may correspond to the 2.4 GHz Band Info field 2433, the 5 GHz Band Info field 2434, and the 6 GHz Band Info field 2435 of FIG. 24.

Second Embodiment

A second embodiment described hereinafter relates to a technical feature that can be performed together with the first embodiment. For example, information described hereinafter may be transmitted/received together while transmitting/receiving at least any one of the plurality of fields of FIG. 23 to FIG. 26 described in the first embodiment. In addition, at least any one of the plurality of fields of FIG. 23 to FIG. 26 described in the first embodiment may be transmitted/received within a configured period (e.g., a service period (SP)) according to the second embodiment.

Description on AP

An AP of the present specification may be described in various manners.

The AP may be described in such a manner that a first RF supporting a first band/link, a second RF supporting a second band/link, and/or a third RF supporting a third band/link are included in one device. That is, it may be described in such a manner that one AP is configured, and the AP supports several bands/links.

The AP may be described in another manner. For example, the AP may be described in such a manner that first to third APs are included in one device. The first AP may transmit/receive a signal of a first band. The second AP may transmit/receive a signal of a second band. The third AP may transmit/receive a signal of a third band. The first AP, the second AP, and/or the third AP may be co-located in one device. In addition, the first AP, the second AP, and/or the third AP may be configured as one-chip. In addition, the first AP, the second AP, and/or the third AP may be controlled by one processor, and control information applied to any one AP may also be shared with another AP by means of the processor.

In summary, an AP supporting a plurality of bands or links may be expressed as one AP or a set of a plurality of APs. For convenience of explanation, hereinafter, in the present specification, the AP supporting the plurality of bands/links will be described by being classified into a first AP, a second AP, a third AP, or the like. However, since the first AP, the second AP, and the third AP are used to identify an operational band or link, the "first to third APs" used in the second embodiment described below may be referred to as an AP.

Basic Operation for Second Embodiment

In an embodiment of the present specification, an operation in which the first AP provides an STA with information of the second AP may be proposed. The first AP may operate in a first band. The second AP may operate in a second band. For example, the first band may include a 2.4 GHz band and/or a 5 GHz band. The second band may include a 6 GHz band.

The second AP may prohibit an EDCA of an STA associated with the second AP. In a BSS in which the EDCA is prohibited, an access method for uplink communication may be limited only to UL MU communication based on a trigger frame. The STA may be allocated a resource through the trigger frame. The STA may transmit a signal (or data) only when the resource is allocated. In addition, the STA may transmit a signal (or data) only in an OFDMA random access, based on the trigger frame.

In addition, in the BSS in which the EDCA is prohibited, active scanning may be prohibited in the STA. In this case, the STA may not be able to transmit a probe request frame in which a broadcast address is set. Instead, the STA may discover the second AP through passive scanning for receiving a beacon (or a beacon frame). In addition, the STA may also discover the second AP through a probe request frame in which a unicast address is set.

When the EDCA of the STA is prohibited and interference caused by OBSS is not severe, a contention overhead may be minimized. In addition, when the EDCA of the STA is prohibited and interference caused by OBSS is not severe, collision may not occur. When the EDCA of the STA is prohibited, the AP may control both DL transmission and UL transmission, so that efficient resource distribution can be achieved and performance can be optimized. However, a feedback process for UL transmission of the STA may be considered. When the feedback process is frequently performed in the STA and a lot of information is included in the feedback, the AP may accurately know a current situation (or state) of the STA. When the AP accurately knows the current situation (or state), the AP may optimize a resource. However, in this case, an overhead may be increased. In addition, if a feedback count and information included in the feedback are decreased to reduce the overhead, it may be difficult to perform resource allocation optimized in the AP.

When the EDCA of the STA is prohibited, the STA may perform UL feedback only when the AP transmits a trigger frame. Therefore, when there is a change in traffic to be transmitted by the STA or a current resource allocation level is not appropriate, it may be difficult for the STA to compensate for the problem. A method of performing the feedback based on the OFDMA random access may be able to compensate for the problem above. However, the method of performing the feedback based on the OFDMA random access may be performed when the AP properly allocates a resource for the OFDMA random access. According to an embodiment, it may be difficult for the AP to predict the OFDMA random access of the STA. It may be difficult for the AP to properly allocate a resource to each STA.

In addition, when UL data transmission of the current STA is sensitive to a latency, the AP shall allocate the resource according to the latency of the STA. However, when the AP cannot allocate the resource according to the latency of the STA, the STA may solve this through the EDCA. When a UL data frame is very short, the STA may transmit a UL data frame directly to the AP without having to be allocated a resource through a feedback. When the STA transmits the UL data frame through the above scheme, an overhead may be reduced.

Therefore, in the BSS in which the EDCA is prohibited, it may be important that the feedback is achieved efficiently and rapidly. It may also be important to decrease a delay even when the STA first performs an association process with respect to the AP.

The present specification may propose a method in which the first AP operating in the first band (the 2.4 GHz band or the 5 GHz band) provides the second AP operating in the second band (the 6 GHz band) with UL resource allocation information for a feedback, UL data transmission, association process, or the like.

The STA may be associated with the first AP operating in the first band (the 2.4 GHz and or the 5 GHz band). The STA may obtain (or receive) information on the second AP operating in the second band (the 6 GHz band) from the first AP. In this case, the information on the second AP may be included in a neighbor report element. The neighbor report element may be used when transferring neighboring BSS information. The neighbor report element may include information on a BSSID, a BSS channel, a PHY type, an AP capability, or a beacon period.

However, the neighbor report element may not be able to represent every information on a current BSS situation or a BSS operation. Therefore, in the BSS in which the EDCA is prohibited, performance may be optimized when information on a feedback process or association process is provided in advance to the STA.

According to an embodiment, the STA may not be provided in advance with the information on the feedback process or association process. The STA may move from the first band (the 2.4 GHz or the 5 GHz band) to the second band (the 6 GHz band). That is, the STA may change a connection with the first AP to a connection with the second AP. In this case, since the STA cannot directly be associated with the second AP, an association operation may be performed with respect to the second AP after waiting for a specific period of time. In addition, the STA may wait for an unspecified period of time to perform the feedback. Even if the STA waits for the unspecified period of time to perform the feedback, the STA may be short of a feedback resource. In this case, when the STA operates in the first band, performance may be more decreased than when the STA operates in the second band.

In the BSS in which the EDCA is prohibited, the STA may transmit a signal (or data) only when a resource is allocated by using a trigger frame. The trigger frame may allocate a resource which can be transmitted exclusively by the STA and a resource which can contend through an OFDMA random access. In order for the STA to perform the feedback operation or the association operation, the STA may need resource information for the OFDMA random access. That is, the STA may need the trigger frame including the resource information.

Accordingly, hereinafter, a specific operation for allocating a resource through a trigger frame will be described in a multi-link situation.

Specific Operation for Second Embodiment

A second embodiment of the present specification may propose a method of transmitting/receiving a signal (or data) in a transmitting STA (or AP) and/or a receiving STA, by using a target wake time (TWT) element (e.g., a broadcast TWT element).

A target wake time technology is defined as a power save technology of the IEEE 802.11ah standard. That is, the target wake time technology can reduce power consumption of the transmitting STA (or AP) or the receiving STA in a BSS. The target wake time technology has been extended to an individual TWT/broadcast TWT technology in the IEEE 802.11ax standard.

According to a broadcast TWT technology, in order to transmit/receive buffered data with respect to an unspecified STA among STAs operating at low power, the transmitting STA (or AP) may transmit a trigger frame including an OFDMA random access resource. In order to reduce unnecessary power consumption of a low-power STA, a broadcast TWT element of a beacon frame may include information such as a transmission timing or the like of the trigger frame.

According to a second embodiment of the present specification, the receiving STA may obtain information for performing communication in the second link from the transmitting STA through the first link. The receiving STA may perform communication with the transmitting STA through the second link, based on the information for performing communication in the second link. The transmitting STA may include a first AP supporting the first link and a second AP supporting the second link. The first AP and the second AP may be co-located to operate, and may be configured as one-chip.

The first link or the second link may be included within a 2.4 GHz, 5 GHz, or 6 GHz band. For example, the first link may be received through a first band (e.g., 2.4 GHz or 5 GHz). The second link may be received through a second band (a 6 GHz band) different from the first band.

The receiving STA which supports a multi-link including the first link and the second link may receive a target wake time (TWT) element (e.g., a broadcast TWT element) through the first link. The receiving STA may support the multi-link including the first link and the second link. That is, the receiving STA may transmit/receive a signal (or data) through the first link and/or the second link. The receiving STA may establish a connection with respect to the transmitting STA through the first link and/or the second link.

The receiving STA may receive a TWT element through the first link. The TWT element may be included in a beacon (or a beacon frame). That is, the receiving STA may receive the TWT element through the beacon.

The TWT element may include information for configuring a TWT period for the second link. The TWT period may be called a service period (SP). For example, the TWT element may include information on a length of the TWT period and/or a timing at which the trigger is transmitted in the transmitting STA. As another example, the TWT element may include information related to a target wake time, information related to a nominal minimum TWT wake duration, information related to a TWT wake interval mantissa, information related to a broadcast TWT persistence exponent/mantissa, and/or information related to a broadcast TWT ID.

The receiving STA may change an operational mode of the receiving STA from a first mode to a second mode, in response to the beacon. The first mode may include an awake mode. The second mode may include a doze mode. The receiving STA may operate in the second mode, before receiving the beacon. When receiving the beacon, the receiving STA may change the operational mode from the second mode to the first mode. Therefore, the receiving STA may receive the beacon in the first mode. The receiving STA may change again the operational mode of the receiving STA from the first mode to the second mode, in response to the beacon (or after receiving the beacon).

The receiving STA may configure a TWT period for the second link, based on the TWT element. Since the TWT element includes information for configuring the TWT period for the second link, based on this, the receiving STA may configure the TWT period for the second link. The receiving STA may change the operational mode from the second mode to the first mode before the TWT period for the second link starts. Therefore, the receiving STA may operate in the first mode within the TWT period.

The receiving STA may perform communication with the transmitting STA through the second link within the TWT period. Specifically, the receiving STA may receive the trigger frame from the transmitting STA through the second link. The receiving STA may be allocated a resource through the trigger frame. The receiving STA may transmit/receive a signal (or data) through the allocated resource.

According to an embodiment, the TWT element may include information for configuring the TWT period for the first link and/or second link. The receiving STA may configure the TWT period for the first link, the TWT period for the second link, and/or the TWT period for the first link and second link, based on the TWT element. For example, when the receiving STA configures the TWT period for the first link and second link, the receiving STA may perform communication with the transmitting STA through the first link and/or the second link within the TWT period.

Figure 27:
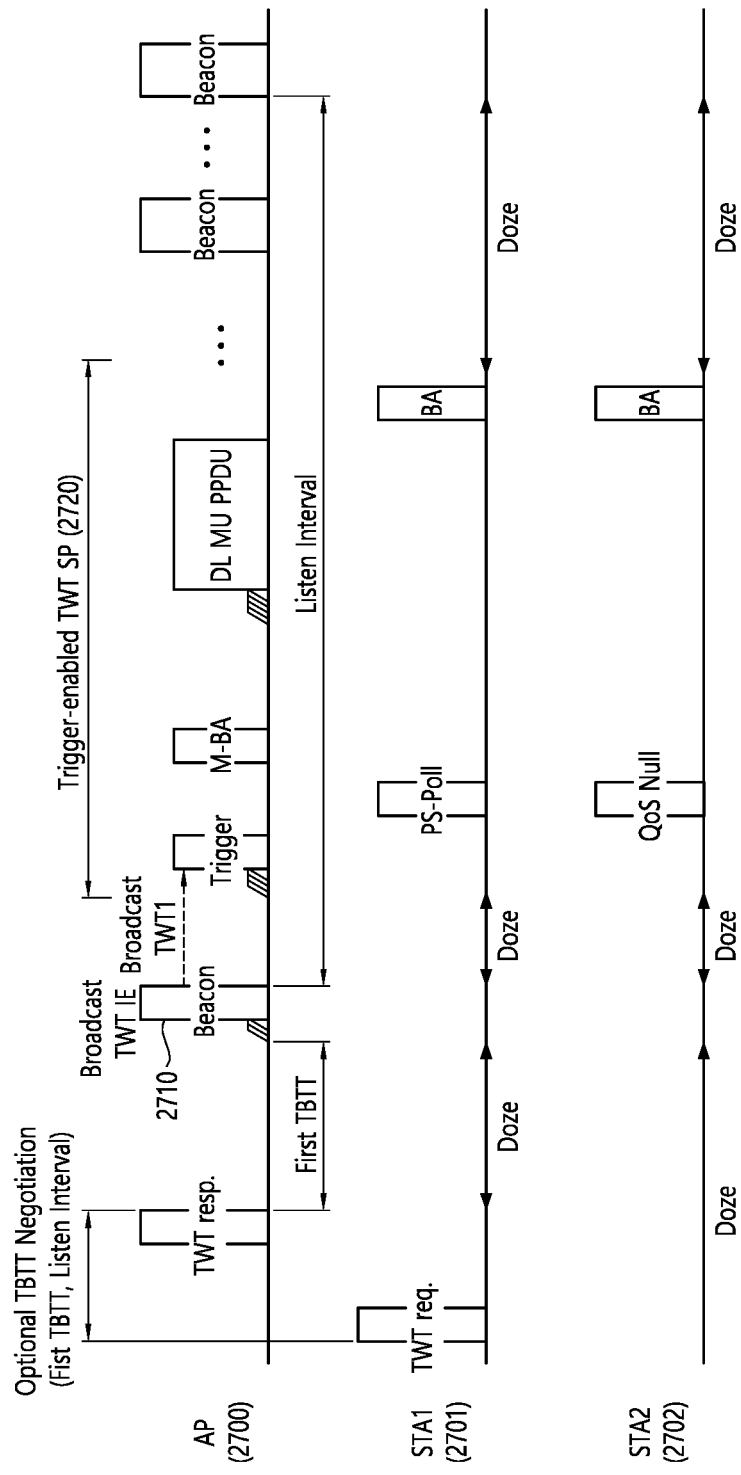
FIG. 27 illustrates an example of a TWT procedure.

The aforementioned operation of the transmitting STA and receiving STA may be illustrated through a specific example in FIG. 27.

FIG. 27 illustrates an example of a TWT procedure.

Referring to FIG. 27, the aforementioned transmitting STA may be related to an AP 2700. The aforementioned receiving STA may be related to an STA1 2701.

The AP 2700 may perform a target beacon transmission time (TBTT) negotiation procedure with respect to the STA1 2701. Specifically, the STA1 2701 may transmit a TWT request frame to the AP 2700. The AP 2700 may transmit a TWT response frame, in response to the TWT request frame. The TWT response frame may include information for allocating a broadcast TWT ID. The TBTT negotiation procedure may be optional.

Thereafter, the AP 2700 may transmit a beacon 2710. The beacon 2710 may include a broadcast TWT element. The broadcast TWT element may include information on a service period (SP) 2720. Specifically, the broadcast TWT element may include information related to a target wake time, information related to a nominal minimum TWT wake duration, information related to a TWT wake interval mantissa, information related to a broadcast TWT persistence exponent/mantissa, and/or information related to a broadcast TWT ID. The information may be described below in greater detail with reference to FIG. 28 to FIG. 30.

According to an embodiment, the beacon 2710 may be transmitted through a first link. The beacon 2710 may include information related to the SP 2720 for a second link. Through the first link, the AP 2700 may transmit information for configuring the SP 2720 in the second link to the STA1 2701 or an STA2 2702 through the beacon 2710.

According to an embodiment, the beacon 2710 may include information related to the SP 2720 for the first link. The AP 2700 may transmit information for configuring the SP 2720 in the first link to the STA1 2701 or the STA2 2702 through the beacon 2710.

According to an embodiment, the beacon 2710 may also include information related to the SP 2710 for a multi-link in which the first link and the second link are aggregated. The AP 2700 may transmit information for configuring the SP 2720 in the multi-link to the STA1 2701 or the STA2 2702 through the beacon 2710.

The AP 2700 may transmit a trigger frame within the SP 2720. The AP 2700 may transmit the trigger frame, in order to receive data buffered in the STA (the STA1 2701 or the STA2 2702). The trigger frame may include an OFDMA random access resource. The STA1 2701 or the STA2 2702 may exchange data with the AP 2700, based on the trigger frame.

Figure 28:
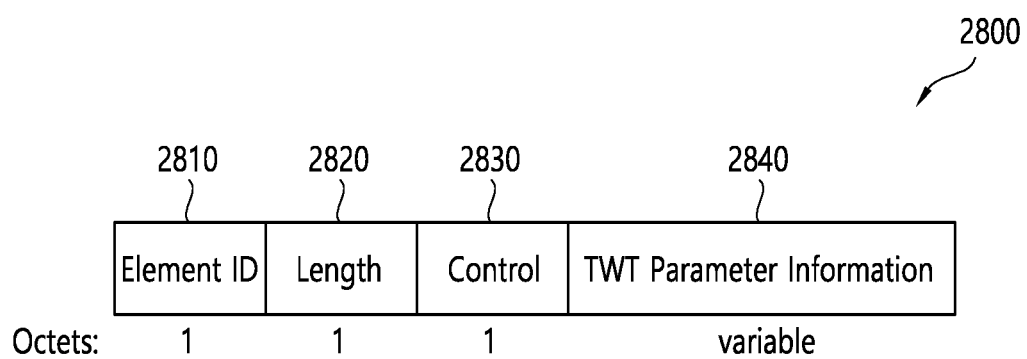
FIG. 28 to FIG. 30 illustrate a frame format of a TWT element.
Figure 29:
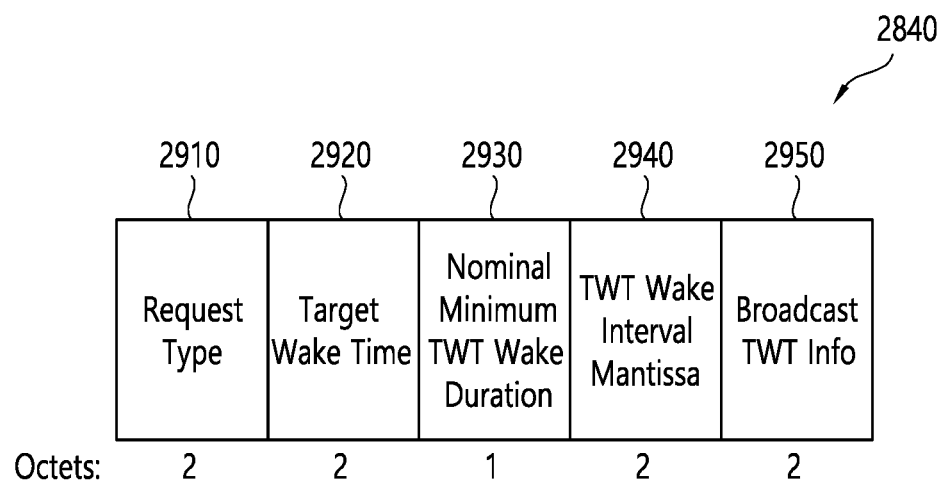
Figure 30:
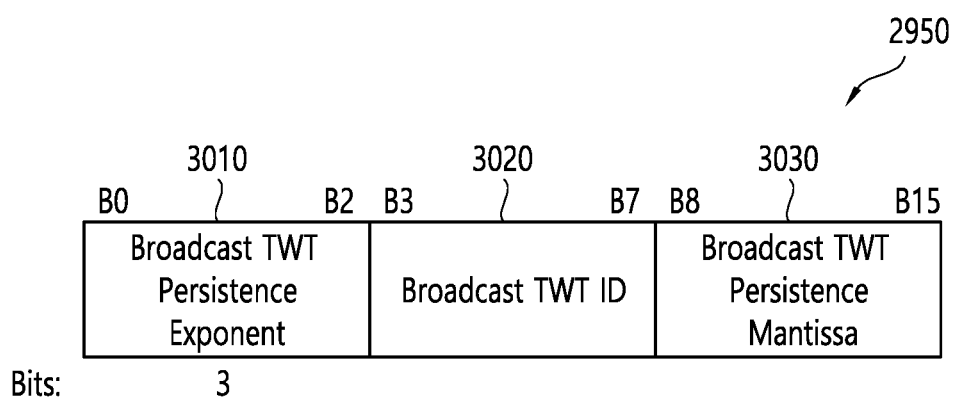

FIG. 28 to FIG. 30 illustrate a frame format of a TWT element.

Referring to FIG. 28 to FIG. 30, a first AP operating in a first band (a 2.4 GHz or 5 GHz band) may provide an STA with a broadcast TWT element 2800 of a second AP operating in a second band (a 6 GHz band). The broadcast TWT element 2800 may include information related to a target wake time, information related to a nominal minimum TWT wake duration, information related to a TWT wake interval mantissa, information related to a broadcast TWT persistence exponent/mantissa, and/or information related to a broadcast TWT ID.

The broadcast TWT element 2800 may include an element ID field 2810, a length field 2820, a control field 2830, and/or a TWT parameter information field 2840.

The element ID field 2810 may include information on an element ID. The length field 2820 may include information on the number of octets after the length field 2820. The control field 2830 may include information on a TWT control. For example, the information on the TWT control may include information on a null data PPDU (NDP) paging indicator, information indicating that it is a broadcast TWT element, and/or information on whether a TWT information frame is deactivated, or the like.

The TWT parameter information field 2840 may include a request type field 2910, a target wake time field 2920, a nominal minimum TWT wake duration field 2930, a TWT wake interval mantissa field 2940, and/or a broadcast TWT Info field 2950.

The request type field 2910 may include information on whether it is a TWT request STA or a TWT response STA and/or information on a type of a TWT command.

The target wake time field 2920 may include information on a timing at which a first trigger frame is transmitted based on a beacon. For example, referring to FIG. 27, the target wake time field 2920 may include information on a timing at which a trigger frame within the SP 2720, as a first trigger frame, is transmitted after the beacon 2710.

The nominal minimum TWT wake duration field 2920 may include length information of a service period to be allocated by the trigger frame. For example, referring to FIG. 27, the nominal minimum TWT wake duration field 2920 may include length information of the SP 2720.

The TWT wake interval mantissa field 2930 may include information on an interval by which a second trigger frame is transmitted after the first trigger frame within a service period (SP).

The broadcast TWT Info field 2950 may include a broadcast TWT persistence exponent field 3010, a broadcast TWT ID field 3020, and/or a broadcast TWT persistence mantissa field 3030.

The broadcast TWT persistence exponent field 3010 and/or the broadcast TWT persistence mantissa field 3030 may include information on a period in which corresponding broadcast TWT information persists. That is, the broadcast TWT persistence exponent field 3010 and/or the broadcast TWT persistence mantissa field 3020 may include information on unit of periodicity of a beacon. In other words, the persistence mantissa field 3020 may include information on a time during which information included in a broadcast TWT element is valid. For example, the persistence mantissa field 3020 may include information on the number of beacons during which the information included in the broadcast TWT element is valid.

The broadcast TWT ID field 3020 may include information on a corresponding broadcast TWT ID. For example, when a broadcast TWT element is transmitted to all STAs, the broadcast TWT ID field 3020 may have a first value (e.g., {0}). As another example, when the broadcast TWT element is transmitted to only a specific STA, the broadcast TWT ID field 3020 may have a second value (e.g., {1}). When the broadcast TWT element is transmitted only to the specific STA, the specific STA may be allocated a resource through a trigger frame, and may perform communication through the allocated resource.

In the present specification, regarding the aforementioned broadcast TWT information, it may be proposed that the first AP operating in the first band (the 2.4 GHz or 5 GHz band) provides the STA with the entirety or part of the broadcast TWT information of the second AP operating in the second band (the 6 GHz band). The broadcast TWT information may be included in the broadcast TWT element.

If the entirety of the broadcast TWT information is provided to the STA, the first AP may transmit the entirety of the broadcast TWT element (e.g., the broadcast TWT element 2800 of FIG. 28).

If the part of the broadcast TWT information is provided to the STA, the first AP may transmit the part of the broadcast TWT information to the STA through a new element distinct from the broadcast TWT element. If the part of the broadcast TWT information is provided to the STA, the first AP may transmit the part of the broadcast TWT information to the STA by including it to the neighbor report element.

The part of the broadcast TWT information may include information on target wake time. The remaining information, excluding the information on target wake time from the broadcast TWT information, may be added or omitted.

When the entirety of the broadcast TWT element is transmitted to the STA, a field for determining whether information included in the broadcast TWT element is information on a currently associated AP or information on a currently un-associated AP may be required. Therefore, a reserved bit of a control field may include information for determining whether it is the information on the currently associated AP or the information on the currently un-associated AP.

For example, the first AP operating in the first band (e.g., the 2.4 or 5 GHz band) may be the currently associated AP. The second AP operating in the second band (e.g., the 6 GHz band) may be the currently un-associated AP. In this case, the broadcast TWT element may include information for determining whether the information included in the broadcast TWT element is the information on the currently associated first AP or the information on the currently un-associated second AP. For example, the reserved bit of the control field included in the broadcast TW element may include information for determining whether the information included in the broadcast TWT element is the information on the first AP or the information on the second AP. If the reserved bit of the control field has a first value {0}, the broadcast TWT element may include the information on the first AP. If the reserved bit of the control field has a second value {1}, the broadcast TWT element may include the information on the second AP.

As another example, the reserved bit may be further used to set a bit for each band. The reserved bit may include information on whether it is the first AP operating in the first band (the 2.4 GHz band), the second AP operating in the second band (the 6 GHz band), or the third AP operating in the third band (the 5 GHz band).

Figure 31:
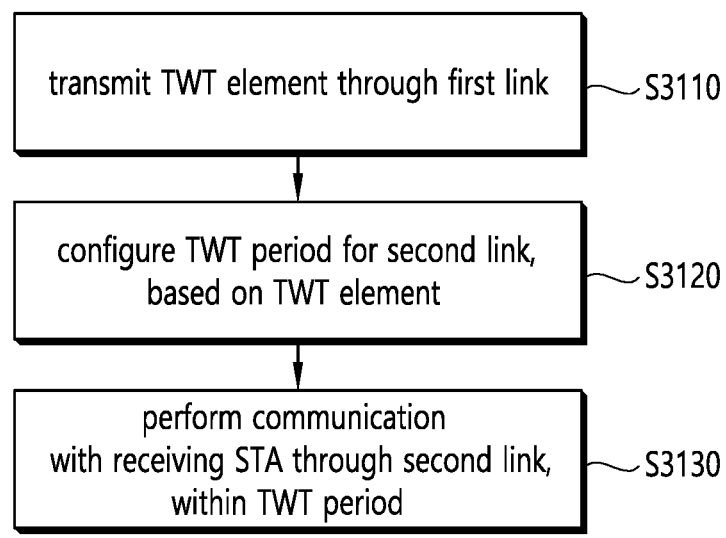
FIG. 31 is a flowchart for describing an exemplary operation of a transmitting STA.

FIG. 31 is a flowchart for describing an exemplary operation of a transmitting STA.

Referring to FIG. 31, in step S3110, the transmitting STA (or AP) (e.g., the AP 2700 of FIG. 27) may transmit a target wake time (TWT) element (e.g., the broadcast TWT element 2800 of FIG. 28) through a first link. The TWT element may be included in a beacon (or a beacon frame). That is, the transmitting STA may transmit the TWT element through the beacon.

The TWT element may include information for configuring a TWT period (e.g., the SP 2720 of FIG. 27) for the second link. For example, the TWT element may include information on a length of the TWT period and/or a timing at which the trigger is transmitted in the transmitting STA. As another example, the TWT element may include information related to a target wake time, information related to a nominal minimum TWT wake duration, information related to a TWT wake interval mantissa, information related to a broadcast TWT persistence exponent/mantissa, and/or information related to a broadcast TWT ID.

In step S3120, the transmitting STA may configure a TWT period for the second link, based on the TWT element. Since the TWT element includes information for configuring the TWT period for the second link, based on this, the transmitting STA may configure the TWT period for the second link. Specifically, after a beacon is transmitted through the first link, the transmitting STA may configure the TWT period by transmitting a trigger frame through the second link. The TWT period may be called a service period (SP).

In step S3130, the transmitting STA may perform communication with a receiving STA (e.g., the STA1 2701 of FIG. 27) through the second link within the TWT period. The transmitting STA may allocate a resource for performing communication with the receiving STA through the trigger frame. The resource may be allocated in the second link. The transmitting STA may perform communication through the allocated resource with respect to the receiving STA.

Thereafter, the transmitting STA may transmit a second trigger frame through the second link. The transmitting STA may configure a second TWT period for the second link through the second trigger frame. The transmitting STA may perform communication with the receiving STA within the second TWT period.

Figure 32:
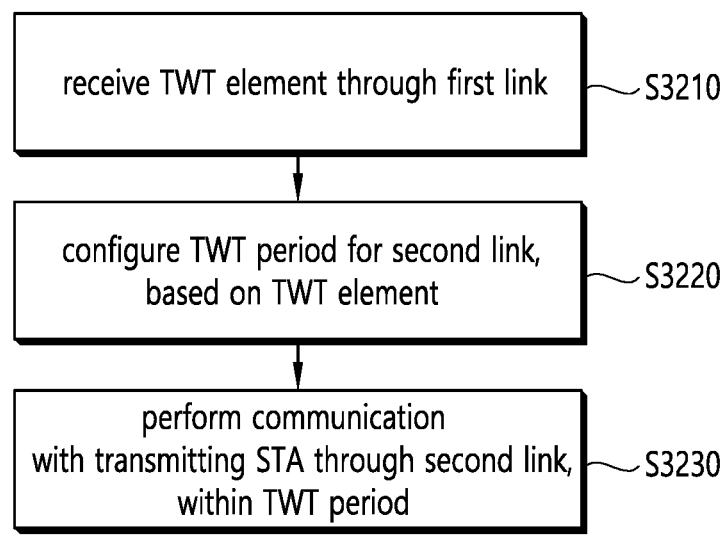
FIG. 32 is a flowchart for describing an exemplary operation of a receiving STA.

FIG. 32 is a flowchart for describing an exemplary operation of a receiving STA.

Referring to FIG. 32, in step S3210, the receiving STA (e.g., the STA1 2701 of FIG. 27) may receive a target wake time (TWT) element (e.g., the broadcast TWT element 2800 of FIG. 28) through a first link. The TWT element may be included in a beacon (or a beacon frame). That is, the receiving STA may receive the TWT element through the beacon.

The TWT element may include information for configuring a TWT period (e.g., the SP 2720 of FIG. 27) for the second link. For example, the TWT element may include information on a length of the TWT period and/or a timing at which the trigger is transmitted in the transmitting STA. As another example, the TWT element may include information related to a target wake time, information related to a nominal minimum TWT wake duration, information related to a TWT wake interval mantissa, information related to a broadcast TWT persistence exponent/mantissa, and/or information related to a broadcast TWT ID.

In step S3220, the receiving STA may configure a TWT period for the second link, based on the TWT element. Since the TWT element includes information for configuring the TWT period for the second link, based on this, the receiving STA may configure the TWT period for the second link. Specifically, after a beacon is transmitted, the receiving STA may configure the TWT period by receiving a trigger frame. The TWT period may be called a service period (SP).

In step S3230, the receiving STA may perform communication with the transmitting STA (e.g., the AP 2700 of FIG. 27) through the second link within the TWT period. A resource for performing communication with the transmitting STA through the trigger frame received from the transmitting STA may be allocated to the receiving STA. The resource may be allocated in the second link. The receiving STA may perform communication through the allocated resource with respect to the transmitting STA.

Thereafter, the receiving STA may receive a second trigger frame through the second link. The receiving STA may configure a second TWT period for the second link through the second trigger frame. The receiving STA may perform communication with the transmitting STA within the second TWT period.

Figure 33:
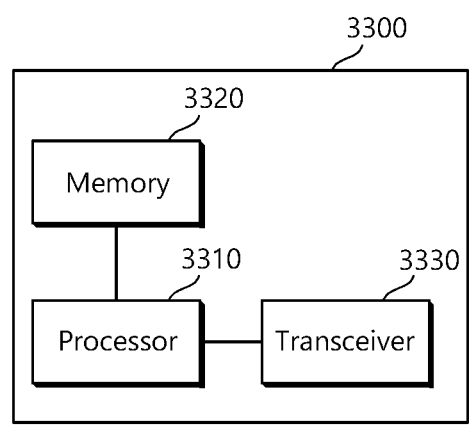
FIG. 33 illustrates a transmitting STA or a receiving STA to which an example of the present disclosure is applied.

FIG. 33 illustrates a transmitting STA or a receiving STA to which an example of the present disclosure is applied.

Referring to FIG. 33, the STA 3300 may include a processor 3310, a memory 3320, and a transceiver 3330. The features of FIG. 33 may be applied to a non-AP STA or an AP STA. The illustrated processor, memory, and transceiver may be implemented as separate chips, or at least two or more blocks/functions may be implemented through a single chip.

The illustrated transceiver 3330 performs a signal transmission/reception operation. Specifically, the transceiver 3330 may transmit and receive IEEE 802.11 packets (e.g., IEEE 802.11a/b/g/n/ac/ax/be, etc.).

The processor 3310 may implement the functions, processes, and/or methods proposed in the present disclosure. Specifically, the processor 3310 may receive a signal through the transceiver 3330, process the received signal, generate a transmission signal, and perform control for signal transmission.

The processor 3310 may include an application-specific integrated circuit (ASIC), another chipset, a logic circuit, and a data processing device. The memory 3320 may include read-only memory (ROM), random access memory (RAM), flash memory, memory card, storage medium, and/or other storage device.

The memory 3320 may store a signal (i.e., a reception signal) received through the transceiver and may store a signal (i.e., a transmission signal) to be transmitted through the transceiver. That is, the processor 3310 may acquire the received signal through the memory 3320 and store the signal to be transmitted in the memory 3320.

Figure 34:
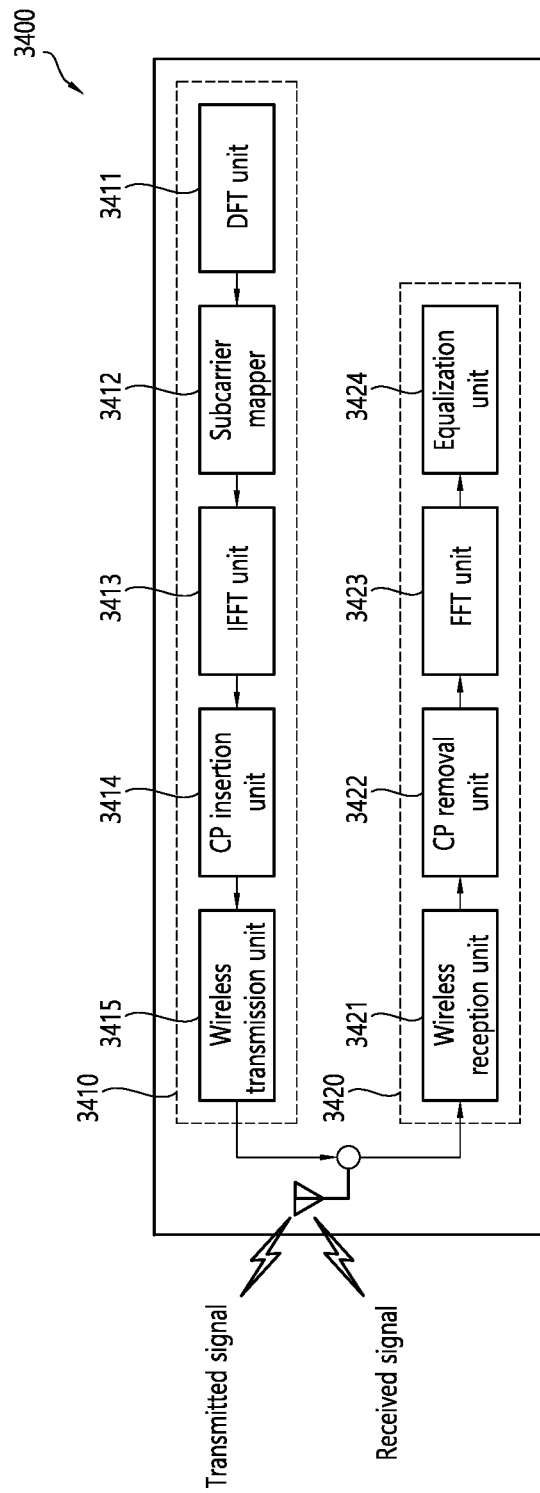
FIG. 34 illustrates another example of a detailed block diagram of a transceiver.

FIG. 34 illustrates another example of a detailed block diagram of a transceiver. Some or all blocks of FIG. 34 may be included in the processor 3310. Referring to FIG. 34, a transceiver 3400 includes a transmission part 3401 and a reception part 3402. The transmission part 3401 includes a discrete Fourier transform (DFT) unit 3411, a subcarrier mapper 3412, an IDFT/(inverse fast Fourier transform) IFFT unit 3413, a CP insertion unit 3414, and a wireless transmission unit 3415. The transmission part 3401 may further include a modulator. In addition, for example, the transmission part 3401 may further include a scramble unit (not shown), a modulation mapper (not shown), a layer mapper (not shown), and a layer permutator (not shown), and these components may be arranged before the DTF unit 3411. That is, in order to prevent an increase in a peak-to-average power ratio (PAPR), the transmission part 3401 allows information to first go through first the DFT unit 3411 before mapping a signal to a subcarrier. After a signal spread by the DFT unit 3411 (or precoded in the same sense) is mapped through the subcarrier mapper 3412, the mapped signal goes through the IDTF/IFFT unit 3413 so as to be generated as a signal on a time axis.

The DFT unit 3411 performs DFT on input symbols and outputs complex-valued symbols. For example, when Ntx symbols are input (here, Ntx is a natural number), a DFT size is Ntx. The DFT unit 3411 may be referred to as a transform precoder. The subcarrier mapper 3412 maps the complex-valued symbols to each subcarrier in a frequency domain. The complex symbols may be mapped to resource elements corresponding to a resource block allocated for data transmission. The subcarrier mapper 3412 may be referred to as a resource element mapper. The IDFT/IFFT unit 3413 performs IDFT/IFFT on an input symbol and outputs a baseband signal for data as a time domain signal. The CP insertion unit 3414 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 3402 includes a wireless reception unit 3421, a CP removal unit 3422, an FFT unit 3423, an equalization unit 3424, and the like. The wireless reception unit 3421, the CP removing unit 3422, and the FFT unit 3423 of the receiving part 3402 perform reverse functions of the wireless transmission unit 3415, the CP inserting unit 3414, and the IFF unit 3413 of the transmitting part 3401. The receiving part 3402 may further include a demodulator.

In addition to the illustrated blocks, the transceiver of FIG. 34 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, the method comprising:
   transmitting, by a station (STA) multi-link device (MLD) supporting a plurality of links including a first link and a second link, an association request frame including a link identification (ID) information field related to the plurality of links to an access point (AP) MLD;
   receiving, by the STA MLD, a target wake time (TWT) element through the first link from the AP MLD, wherein the TWT element includes a request type field, a TWT control field for configuring a nominal minimum TWT wake duration, and a link ID control field indicating at least one link to which the TWT element applies, wherein the request type field includes a TWT request subfield related to whether the TWT element is transmitted by a TWT requesting STA or a TWT responding STA,
   wherein the request type field has a length of two octets, and the TWT control field has a length of one octet; and
   applying, by the STA MLD, the TWT element to the at least one link indicated by the link ID control field.

2. The method of claim 1, wherein the first link is configured based on one of a 2.4 GHz band, a 5 GHz band, and/or a 6 GHz band.

3. The method of claim 1, wherein the second link is configured based on one of a 2.4 GHz band, a 5 GHz band, and/or a 6 GHz band.

4. The method of claim 1, wherein the STA MLD includes a first STA operating in the first link and a second STA operating in the second link.

5. A method in a wireless local area network (WLAN) system, the method comprising:
   receiving, by an access point (AP) multi-link device (MLD) supporting a plurality of links including a first link and a second link, an association request frame including a link identification (ID) information field related to the plurality of links from a station (STA) MLD;
   transmitting, by the AP MLD, a target wake time (TWT) element through the first link to the STA MLD, wherein the TWT element includes a request type field, a TWT control field for configuring a nominal minimum TWT wake duration, and a link ID control field indicating at least one link to which the TWT element applies, wherein the request type field includes a TWT request subfield related to whether the TWT element is transmitted by a TWT requesting STA or a TWT responding STA,
   wherein the request type field has a length of two octets, and the TWT control field has a length of one octet; and
   performing, by the AP MLD, a TWT operation with the STA MLD through the at least one link indicated by the link ID control field.

6. The method of claim 5, wherein the first link is configured based on one of a 2.4 GHz band, a 5 GHz band, and/or a 6 GHz band.

7. The method of claim 5, wherein the second link is configured based on one of a 2.4 GHz band, a 5 GHz band, and/or a 6 GHz band.

8. The method of claim 5, wherein the AP MLD includes a first AP operating in the first link and a second AP operating in the second link.

9. A station (STA) multi-link device (MLD) in a wireless local area network (WLAN) system, the STA MLD comprising:
- a transceiver adapted to support plurality of links including a first link and a second link; and
- a processor adapted to control the transceiver,
- wherein the processor is further adapted to:
  - transmit an association request frame including a link identification (ID) information field related to the plurality of links to an access point (AP) MLD;
  - receive a target wake time (TWT) element through the first link from the AP MLD, wherein the TWT element includes a request type field, a TWT control field for configuring a nominal minimum TWT wake duration, and a link ID control field indicating at least one link to which the TWT element applies, wherein the request type field includes a TWT request subfield related to whether the TWT element is transmitted by a TWT requesting STA or a TWT responding STA,
  - wherein the request type field has a length of two octets, and the TWT control field has a length of one octet; and
  - apply the TWT element to the at least one link indicated by the link ID control field.

10. The STA MLD of claim 9, wherein the first link is configured based on one of a 2.4 GHz band, a 5 GHz band, and/or a 6 GHz band.

11. The STA MLD of claim 9, wherein the second link is configured based on one of a 2.4 GHz band, a 5 GHz band, and/or a 6 GHz band.

12. The STA MLD of claim 9, wherein the STA MLD includes a first STA operating in the first link and a second STA operating in the second link.

13. An access point (AP) multi-link device (MLD) in a wireless local area network (WLAN) system, the AP MLD comprising:
- a transceiver adapted to support plurality of links including a first link and a second link; and
- a processor adapted to control the transceiver,
- wherein the processor is further adapted to:
  - receive an association request frame including a link identification (ID) information field related to the plurality of links from a station (STA) MLD;
  - transmit a target wake time (TWT) element through the first link to the STA MLD, wherein the TWT element includes a request type field, a TWT control field for configuring a nominal minimum TWT wake duration, and a link ID control field indicating at least one link to which the TWT element applies, wherein the request type field includes a TWT request subfield related to whether the TWT element is transmitted by a TWT requesting STA or a TWT responding STA,
  - wherein the request type field has a length of two octets, and the TWT control field has a length of one octet; and
  - perform a TWT operation with the STA MLD through the at least one link indicated by the link ID control field.

14. The AP MLD of claim 13, wherein the first link is configured based on one of a 2.4 GHz band, a 5 GHz band, and/or a 6 GHz band.

15. The AP MLD of claim 13, wherein the second link is configured based on one of a 2.4 GHz band, a 5 GHz band, and/or a 6 GHz band.

16. The AP MLD of claim 13, wherein the AP MLD includes a first AP operating in the first link and a second AP operating in the second link.

* * * * *